United States Patent
Horikoshi et al.

(10) Patent No.: US 11,640,083 B2
(45) Date of Patent: May 2, 2023

(54) OPTICAL COMPENSATION APPARATUS AND LIQUID-CRYSTAL DISPLAY APPARATUS

(71) Applicant: SONY CORPORATION, Tokyo (JP)

(72) Inventors: Ryoko Horikoshi, Kanagawa (JP); Keigo Inoue, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/619,331

(22) PCT Filed: Jun. 21, 2018

(86) PCT No.: PCT/JP2018/023647
§ 371 (c)(1),
(2) Date: Dec. 4, 2019

(87) PCT Pub. No.: WO2019/244302
PCT Pub. Date: Dec. 26, 2019

(65) Prior Publication Data
US 2021/0096429 A1    Apr. 1, 2021

(51) Int. Cl.
*G02F 1/13363* (2006.01)
(52) U.S. Cl.
CPC .... *G02F 1/133634* (2013.01); *G02F 2203/01* (2013.01); *G02F 2203/02* (2013.01);
(Continued)
(58) Field of Classification Search
CPC ................................................ G02F 2413/10
See application file for complete search history.

(56) References Cited

U.S. PATENT DOCUMENTS

| | | | |
|---|---|---|---|
| 2008/0117385 A1* | 5/2008 | Endo | G02F 1/1393 353/20 |
| 2009/0128718 A1* | 5/2009 | Nakagawa | G02F 1/13363 349/8 |

(Continued)

FOREIGN PATENT DOCUMENTS

| | | |
|---|---|---|
| JP | 2003-509726 A | 3/2003 |
| JP | 2008-76706 A | 4/2008 |

(Continued)

OTHER PUBLICATIONS

International Search Report dated Sep. 11, 2018 in PCT/JP2018/023647 (with English Translation of Category of Cited Documents), 4 pages.

*Primary Examiner* — Alexander P Gross
(74) *Attorney, Agent, or Firm* — Oblon, McClelland, Maier & Neustadt, L.L.P.

(57) ABSTRACT

An improvement in contrast is achieved by suitably offsetting a phase difference produced by oblique light in a liquid-crystal panel.
An optical compensation apparatus includes a negative C-plate and two O-plates, an amount of a composite phase difference between the two O-plates and the negative C-plate in a tilt-direction cross section is substantially same as an amount of a phase difference produced by light having each of incident angles in a predetermined incident-angle range in the liquid-crystal panel, and a sign of the composite phase difference is opposite to a sign of the phase difference, the tilt-direction cross section being a cross section parallel to a tilt direction of the liquid crystal in a vertical-alignment-type liquid-crystal panel.

16 Claims, 14 Drawing Sheets

(52) U.S. Cl.
CPC ...... *G02F 2413/03* (2013.01); *G02F 2413/07* (2013.01); *G02F 2413/10* (2013.01); *G02F 2413/14* (2013.01)

(56) References Cited

U.S. PATENT DOCUMENTS

| | | | |
|---|---|---|---|
| 2009/0128719 A1* | 5/2009 | Tateno | G02F 1/133634 |
| | | | 349/8 |
| 2009/0167993 A1 | 7/2009 | Chen et al. | |
| 2010/0026918 A1* | 2/2010 | Nakagawa | G03B 33/12 |
| | | | 349/5 |
| 2011/0228177 A1 | 9/2011 | Fukuda et al. | |

FOREIGN PATENT DOCUMENTS

| | | |
|---|---|---|
| JP | 2011-197213 A | 10/2011 |
| WO | WO 2008/078764 A1 | 7/2008 |

* cited by examiner

OPTICAL COMPENSATION APPARATUS AND LIQUID-CRYSTAL DISPLAY APPARATUS

TECHNICAL FIELD

The present technology relates to an optical compensation apparatus and a liquid-crystal display apparatus, and particularly relates to a technical field for compensating a phase deviation produced by light that passes through a vertical-alignment-type liquid-crystal panel.

BACKGROUND ART

As a liquid-crystal display apparatus that uses a liquid-crystal panel to display image information, a liquid-crystal projector apparatus is known, for example. The liquid-crystal projector apparatus performs spatial-light-modulation by allowing light emitted from a light source to enter the liquid-crystal panel, and generates image light in which the image information is reflected. The liquid-crystal projector apparatus displays the image information by projecting the image light to a target medium such as a screen, for example.

As one of important components that affect quality of the projected image, contrast, which is the ratio of brightness in the black display to brightness in the white display, is taken. In the liquid-crystal projector apparatus, it is effective that the brightness in the black display is necessary minimum for achieving an improvement in contrast.

On the other hand, some liquid-crystal projector apparatuses use a VA-type (vertical-alignment-type: VA=Vertical Alignment) panel as the liquid-crystal panel in recent years. The VA-type liquid-crystal panel arranges liquid-crystal alignment when voltage is not applied orthogonal to a board of the panel such that liquid crystal tilts with respect to the vertical direction of the board when the voltage is applied. High-speed high contrast is achievable by the VA-type liquid-crystal panel. Ideally, the VA-type liquid-crystal panel is normally black, that is, displays black in a state in which the voltage is not applied. Actually, light leakage is produced when the voltage is not applied. Therefore, reproducibility of black is decreased, and contrast may be reduced.

Particularly, in the VA-type liquid-crystal panel in the state in which the voltage is not applied, the liquid crystal is pretilted, that is, the liquid crystal is tilted with respect to the vertical direction of the board in advance, and a phase deviation of the light that passes through the liquid-crystal panel is originated and produced by the pretilt. As a result, light leakage is originated and promoted by the phase deviation.

Here, in a simulation, the VA-type liquid-crystal panel that has a predetermined thickness and in which the liquid crystal is pretilted may be modeled as a tilt positive C-plate (medium having a high refractive index in thickness direction). Therefore, for compensating the phase deviation produced in the VA-type liquid-crystal panel, it is effective that an optical compensation plate of a negative C-plate (medium having a low refractive index in thickness direction) is tilted and arranged in the same direction as pretilt of the liquid crystal, and the phase deviation produced in the liquid-crystal panel is offset by the phase deviation produced in the optical compensation plate.

Moreover, as a method of compensating the phase deviation produced in the VA-type liquid-crystal panel, a method in which, for example, an O-plate and the negative C-plate are used as described in Patent Literature 1 is taken. Here, the O-plate is an optical medium in which an N1 axis having the highest refractive index tilts with respect to a thickness direction when the O-plate is shown by a refractive-index oval, and is formed out of film deposition of an inorganic film by rhombic vapor deposition.

CITATION LIST

Patent Literature

Patent Literature 1: International Patent Laid-open 2008/078764

DISCLOSURE OF INVENTION

Technical Problem

Here, it is difficult that inclination of the N1 axis of the O-plate is freely set due to limitation of a vapor deposition apparatus or a jig and the like. The inclination of the N1 axis is generally about 45 degrees to 60 degrees. On the other hand, an angle of pretilt in the liquid-crystal panel (hereinafter, written "pretilt angle") is about several degrees.

Moreover, with respect to a shape of the refractive-index oval, the O-plate by rhombic vapor deposition is two-axial, and the liquid crystal is one-axial.

In Patent Literature 1, it is mentioned that the phase deviation produced in the liquid-crystal panel is compensated by originating pretilt directly (three-dimensionally by the method like tilted arrangement of the negative C-plate) by the one O-plate. However, this is very difficult by the reason described above. In other words, suiting to the pretilt angle of the liquid crystal is very difficult because the inclination angle of the N1 axis is too large, and suitably compensating the phase deviation is also very difficult because the shape of the refractive-index oval does not suit to the liquid crystal side.

Moreover, in Patent Literature 1, a compensation plate obtained by combining the two O-plates with the negative C-plate is disclosed. However, only an on-plane phase difference (=front phase difference) that is produced by the refractive-index oval projected on the surface of the O-plate and a phase difference Rth in the thickness direction (in Patent Literature 1, both are defined as retardation) are presented, and suitable compensation for the oblique light component, that is, the component of the light entering at the angle tilting with respect to the thickness direction is not described. Even if the front phase difference and the phase difference Rth in the thickness direction are designed to suit the phase difference produced in the liquid crystal, it will be difficult that the phase difference produced by the oblique light at each of incident angles is suitably offset.

In view of the above-mentioned circumstances, it is an object of the present technology to achieve the improvement in contrast by suitably offsetting a phase difference produced by oblique light in the liquid-crystal panel.

Solution to Problem

An optical compensation apparatus according to the present technology includes a negative C-plate and two O-plates, an amount of a composite phase difference between the two O-plates and the negative C-plate in a tilt-direction cross section is substantially same as an amount of a phase difference produced by light having each of incident angles in a predetermined incident-angle range in the liquid-crystal panel, and a sign of the composite phase difference is opposite to a sign of the phase difference, the tilt-direction cross section being a cross section parallel to a tilt direction of the liquid crystal in a vertical-alignment-type liquid-crystal panel.

Due to this, it is possible that the phase difference produced by the oblique light is suitably offset in the liquid-crystal panel.

Moreover, in the optical compensation apparatus according to the present technology, it is desirable that an absolute value of an inclination coefficient of the composite phase difference between the two O-plates in the tilt-direction cross section in an approximate equation obtained by approximating a changing property of the composite phase difference with respect to the incident angle linearly is not 0, and is 0.65 or less.

Here, if the panel design varies, the designed value of the pretilt angle of the liquid crystal may also vary. Moreover, if the pretilt angle varies, the optimal value of the inclination coefficient may also vary. By the setting of the inclination coefficient described above, it is possible that the phase difference produced by the oblique light is suitably offset by corresponding to the case that the range of the designed value of the pretilt angle that may be employed in the panel design is relatively wide, and furthermore, the actual variation of the pretilt angle with respect to the designed value is relatively large.

Furthermore, in the optical compensation apparatus according to the present technology, it is desirable that the absolute value of the inclination coefficient is not 0, and is 0.6 or less.

Due to this, it is possible that the phase difference produced by the oblique light is suitably offset by corresponding to the case that the range of the designed value of the pretilt angle that may be employed in the panel design is relatively narrow, and the actual variation of the pretilt angle with respect to the designed value is relatively small.

In the optical compensation apparatus according to the present technology, it is desirable that the phase difference amount with respect to the 15-degree incident angle of the negative C-plate is 20 nm or less.

Due to this, it is possible that the phase difference produced by the oblique light is suitably offset.

In the optical compensation apparatus according to the present technology, it is desirable that when the phase differences of the liquid-crystal panel with respect to the same incident angles on the positive side and on the negative side are compared with the composite phase difference in the cross section orthogonal to the tilt-direction cross section, the magnitude relationship between the absolute value of the phase difference with respect to the incident angle on the positive side and the absolute value of the phase difference with respect to the incident angle on the negative side is the same as the magnitude relationship between on the side of the liquid-crystal panel and on the side of the composite phase difference.

Due to this, it is possible that the variation of the compensation effect that is originated by the variation of the pretilt angle and is about the phase difference produced by the oblique light is absorbed.

In the optical compensation apparatus according to the present technology, it is desirable that the two O-plates and the negative C-plate are formed as an integrated optical compensation plate.

Due to this, reducing the number of parts and miniaturizing the optical system by integrated formation may be achieved.

In the optical compensation apparatus according to the present technology, it is desirable that a part or all of the two O-plates and the negative C-plate are separated and formed as separate compensation plates.

Due to this, the degree of freedom of arrangement of the compensation plate may be improved. For example, the compensation plate in which the two O-plates are formed and the compensation plate in which the negative C-plate is formed may be separately arranged on the front and the back of the liquid-crystal panel on the optical path from the light source. Alternatively, the compensation plate in which the one O-plate is formed and the compensation plate in which the other O-plate is formed may be separately arranged on the front and the back of the liquid-crystal panel on the optical path, and the compensation plate in which the negative C-plate is formed may be arranged on the front or the back of the liquid-crystal panel on the optical path, or the like.

In the optical compensation apparatus according to the present technology, it is desirable that a part or all of the two O-plates and the negative C-plate are formed and integrated with the liquid-crystal panel or a polarizing plate.

Due to this, reducing the number of the parts and miniaturizing the optical system by integrated formation may be achieved.

Moreover, an liquid-crystal display apparatus according to the present technology includes a vertical-alignment-type liquid-crystal panel and an optical compensation unit including a negative C-plate and two O-plates, and in the optical compensation unit, an amount of a composite phase difference between the two O-plates and the negative C-plate in a tilt-direction cross section is substantially same as an amount of a phase difference produced by light having each of incident angles in a predetermined incident-angle range in the liquid-crystal panel, and a sign of the composite phase difference is opposite to a sign of the phase difference, the tilt-direction cross section being a cross section parallel to a tilt direction of liquid crystal in the liquid-crystal panel.

The similar operation and effect to the optical compensation apparatus according to the present technology may be obtained by the liquid-crystal display apparatus.

In the liquid-crystal display apparatus according to the present technology, it is desirable that the liquid-crystal panel is a transmission-type liquid-crystal panel.

Due to this, it is possible that the phase difference produced by the oblique light is suitably offset in the liquid-crystal panel by corresponding to the case that the transmission-type liquid-crystal panel is employed.

In the liquid-crystal display apparatus according to the present technology, it is desirable that the liquid-crystal panel is a reflective-type liquid-crystal panel.

Due to this, it is possible that the phase difference produced by the oblique light is suitably offset in the liquid-crystal panel by corresponding to the case that the reflective-type liquid-crystal panel is employed.

In the liquid-crystal display apparatus according to the present technology, it is desirable that the absolute value of the inclination coefficient of the composite phase difference between the two O-plates in the tilt-direction cross section in the approximate equation obtained by approximating the changing property of the composite phase difference with respect to the incident angle linearly is not 0, and is 0.65 or less.

Due to this, it is possible that the phase difference produced by the oblique light is suitably offset by corresponding to the case that the range of the designed value of the pretilt angle that may be employed in the panel design is relatively wide, and the actual variation of the pretilt angle with respect to the designed value is relatively large.

In the liquid-crystal display apparatus according to the present technology, it is desirable that the absolute value of the inclination coefficient is not 0, and is 0.6 or less.

Due to this, it is possible that the phase difference produced by the oblique light is suitably offset by corresponding to the case that the range of the designed value of the pretilt angle that may be employed in the panel design is relatively narrow, and the actual variation of the pretilt angle with respect to the designed value is relatively small.

In the liquid-crystal display apparatus according to the present technology, it is desirable that the phase difference amount with respect to the 15-degree incident angle of the negative C-plate is 20 nm or less.

Due to this, it is possible that the phase difference produced by the oblique light is suitably offset.

In the liquid-crystal display apparatus according to the present technology, it is desirable that when the phase differences of the liquid-crystal panel with respect to the same incident angles on the positive side and on the negative side are compared with the composite phase difference in the cross section orthogonal to the tilt-direction cross section, the magnitude relationship between the absolute value of the phase difference with respect to the incident angle on the positive side and the absolute value of the phase difference with respect to the incident angle on the negative side is the same as the magnitude relationship between on the side of the liquid-crystal panel and on the side of the composite phase difference.

Due to this, it is possible that the variation of the compensation effect that is originated by the variation of the pretilt angle and is about the phase difference produced by the oblique light is absorbed.

In the liquid-crystal display apparatus according to the present technology, it is desirable that the two O-plates and the negative C-plate are formed as an integrated optical compensation plate.

Due to this, reducing the number of parts and miniaturizing the optical system by integrated formation may be achieved.

In the liquid-crystal display apparatus according to the present technology, it is desirable that a part or all of the two O-plates and the negative C-plate are separated and formed as separate compensation plates.

Due to this, the degree of freedom of arrangement of the compensation plate may be improved. For example, the compensation plate in which the two O-plates are formed and the compensation plate in which the negative C-plate is formed may be separately arranged on the front and the back of the liquid-crystal panel on the optical path from the light source. Alternatively, the compensation plate in which the one O-plate is formed and the compensation plate in which the other O-plate is formed may be separately arranged on the front and the back of the liquid-crystal panel on the optical path, and the compensation plate in which the negative C-plate is formed may be arranged on the front or the back of the liquid-crystal panel on the optical path, or the like.

In the liquid-crystal display apparatus according to the present technology, it is desirable that a part or all of the two O-plates and the negative C-plate are formed and integrated with the liquid-crystal panel or a polarizing plate.

Due to this, reducing the number of the parts and miniaturizing the optical system by integrated formation may be achieved.

Advantageous Effects of Invention

According to the present technology, it is possible that an improvement in contrast is achieved by suitably offsetting a phase difference produced by oblique light in a liquid-crystal panel.

Note that the effects described above are not limitative, but any effect described in the present disclosure may be produced.

MODE(S) FOR CARRYING OUT THE INVENTION

Hereinafter, an embodiment according to the present technology will be described with reference to the attached drawings in the following order.
<1. Configuration of liquid-crystal display apparatus>
<2. Phase compensation as embodiment>
<3. Modified example>
<4. Summary of embodiment>
<5. Present technology>

1. Configuration of Liquid-Crystal Display Apparatus

Figure 1:
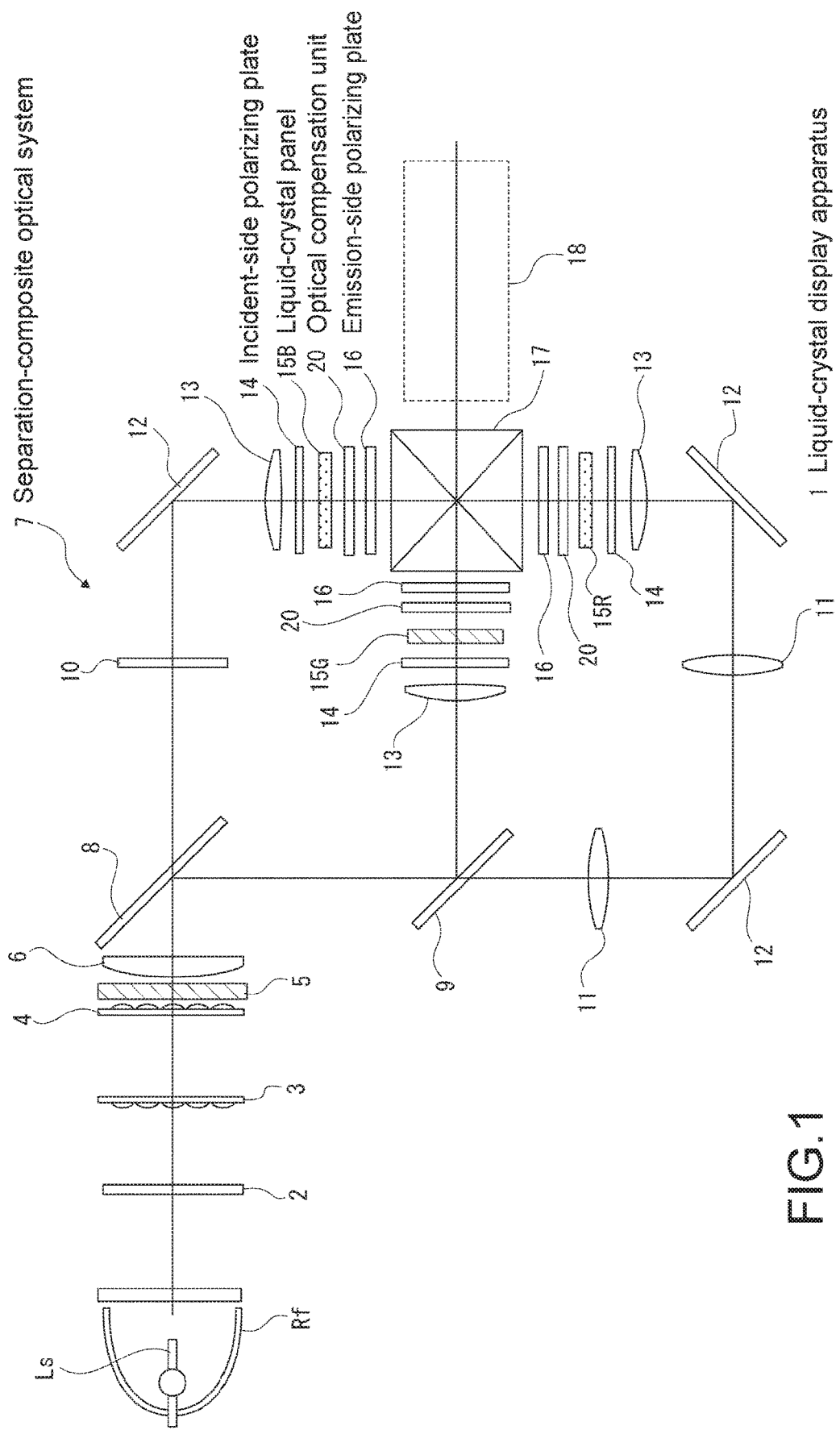
FIG. 1 A diagram showing a configuration example of a liquid-crystal display apparatus of a first embodiment.

FIG. 1 is a diagram showing a configuration example of a liquid-crystal display apparatus 1 as an embodiment according to the present technology.

The liquid-crystal display apparatus 1 is configured as a transmission-type liquid-crystal projector apparatus. Specifically, the liquid-crystal display apparatus 1 is configured as a so-called three-plate liquid-crystal projector apparatus that includes liquid-crystal panels corresponding to a R (red) color, a G (green) color, and a B (blue) color, respectively.

As shown in FIG. 1, the liquid-crystal display apparatus 1 includes a light source Ls, a reflector Rf, a filter 2, a fly eye lens 3, a fly eye lens 4, a polarization-conversion element 5, a condenser lens 6, a separation-composite optical system 7, and a projective lens (projective optical system) 18.

As the light source Ls, for example, an HID (High Intensity Discharge) lamp, an LED (Light Emitting Diode), a laser, or the like may be used. In FIG. 1, the configuration in which the reflector Rf is provided for corresponding to a case that the HID lamp is used as the light source Ls is exemplified. Alternatively, in a case that the LED or the laser is used, the reflector Rf may not be provided.

The light source Ls is arranged on a focus position of the reflector Rf. Light emitted from the light source Ls is reflected by the reflector Rf, and is emitted as substantial parallel light.

As described above, the light emitted from the light source Ls, which is reflected by the reflector Rf to be the substantial parallel light, travels via the filter 2 that filters out an infrared ray and an ultraviolet ray, and then, enters the polarization-conversion element 5 via the fly eye lens (first fly eye lens) 3 and the fly eye lens (second fly eye lens) 4.

The fly eye lens 3 and the fly eye lens 4 function as lenses for making illuminance of light entering liquid-crystal panels 15 (15R, 15G, and 15B) described below uniform.

The polarization-conversion element 5 makes a polarization axis of the emitted light in a predetermined direction. In the present example, light including s-polarization and p-polarization enters the polarization-conversion element 5, and the polarization-conversion element 5 emits the s-polarization.

Light emitted from the polarization-conversion element 5 enters the separation-composite optical system 7 via the condenser lens 6. The condenser lens 6 allows the light emitted from the polarization-conversion element 5 to enter, and condenses the emitted light.

The separation-composite optical system 7 color-separates light emitted from the condenser lens 6 into RGB (red color, green color, and blue color) lights, spatial-light-modulates the RGB lights by each of liquid-crystal panels 10 of the liquid-crystal panels 15R, 15G, and 15B corresponding to the color thereof respectively, then composites the lights, and forms a projected image by the composite light.

The separation-composite optical system 7 includes a dichroic mirror 8, a dichroic mirror 9, a filter 10, relay lenses 11, mirrors 12, condenser lenses 13, incident-side polarizing plates 14, the liquid-crystal panels 15, emission-side polarizing plates 16, optical compensation units 20, and a color-(light-)composite prism 17. Transmission-type liquid-crystal panels are used as the liquid-crystal panels 15, and the liquid-crystal panel 15R spatial-light-modulating light (hereinafter, written "R light") in a red wavelength band, the liquid-crystal panel 15G spatial-light-modulating light (hereinafter, written "G light") in a green wavelength band, and the liquid-crystal panel 15B spatial-light-modulating light (hereinafter, written "B light") in a blue wavelength band are provided.

In the separation-composite optical system 7, a pair of the incident-side polarizing plate 14, the optical compensation unit 20, and the emission-side polarizing plate 16 are provided for each of the liquid-crystal panels 15R, 15G, and 15B.

The dichroic mirror 8 and the dichroic mirror 9 allow each of the RGB lights to pass therethrough or reflect each of the RGB lights, selectively by the wavelength band thereof. The dichroic mirror 8 allows the B light to pass therethrough, and reflects the R light and the G light. The dichroic mirror 9 allows the R light and the G light reflected by the dichroic mirror 8 to enter, allows the R light to pass therethrough, and reflects the G light.

In this manner, the light emitted from the condenser lens 6 is color-separated into the RGB lights.

As shown in FIG. 1, the B light passing through the dichroic mirror 8 travels via the filter 10, and is reflected by the mirror 12. Then, the B light travels via the condenser lens 13, and enters the incident-side polarizing plate 14 provided for corresponding to the liquid-crystal panel 15B.

The G light reflected by the dichroic mirror 9 travels via the condenser lens 13, and enters the incident-side polarizing plate 14 provided for corresponding to the liquid-crystal panel 15G.

The R light passing through the dichroic mirror 9 travels via the relay lens 11, and is reflected by the mirror 12. Then, the R light travels via the relay lens 11 and the condenser lens 13, and enters the incident-side polarizing plate 14 provided for corresponding to the liquid-crystal panel 15R.

In this manner, each of the color-separated RGB lights travels via each of the incident-side polarizing plates 14 corresponding to the color thereof respectively, and enters each of the liquid-crystal panels 15 of the liquid-crystal panels 15R, 15G, and 15B corresponding to the color thereof.

Each of the RGB lights traveling via the liquid-crystal panels 15R, 15G, and 15B is optically compensated (phase-deviation compensation) by the optical compensation unit 20 described below, and then, enters the emission-side polarizing plate 16. The amount of light emitted from the emission-side polarizing plate 16 is adjusted by the degree of light-modulating in the liquid-crystal panel 15.

The color-composite prism 17 is configured to allow the G light to pass therethrough and emit the G light to the projective lens 18, and is configured to reflect the R light and the B light and emit the R light and the B light to the projective lens 18. The color-composite prism 17 is configured by jointing, for example, a plurality of glass prisms (four isosceles right prisms having substantially same shapes), and two interference filters having predetermined optical properties are formed on a joint surface of each of the glass prisms. The first interference filter reflects the B light, and allows the R light and the G light to pass therethrough.

The second interference filter reflects the R light, and allows the G light and the B light to pass therethrough. Therefore, each of the RGB lights light-modulated by the liquid-crystal panels 15R, 15G, and 15B is composited by the color-composite prism 17, and enters the projective lens 18.

The projective lens 18 magnifies light emitted from the separation-composite optical system 7 under a predetermined magnification, and projects an image to a projected medium such as a screen.

Figure 2:
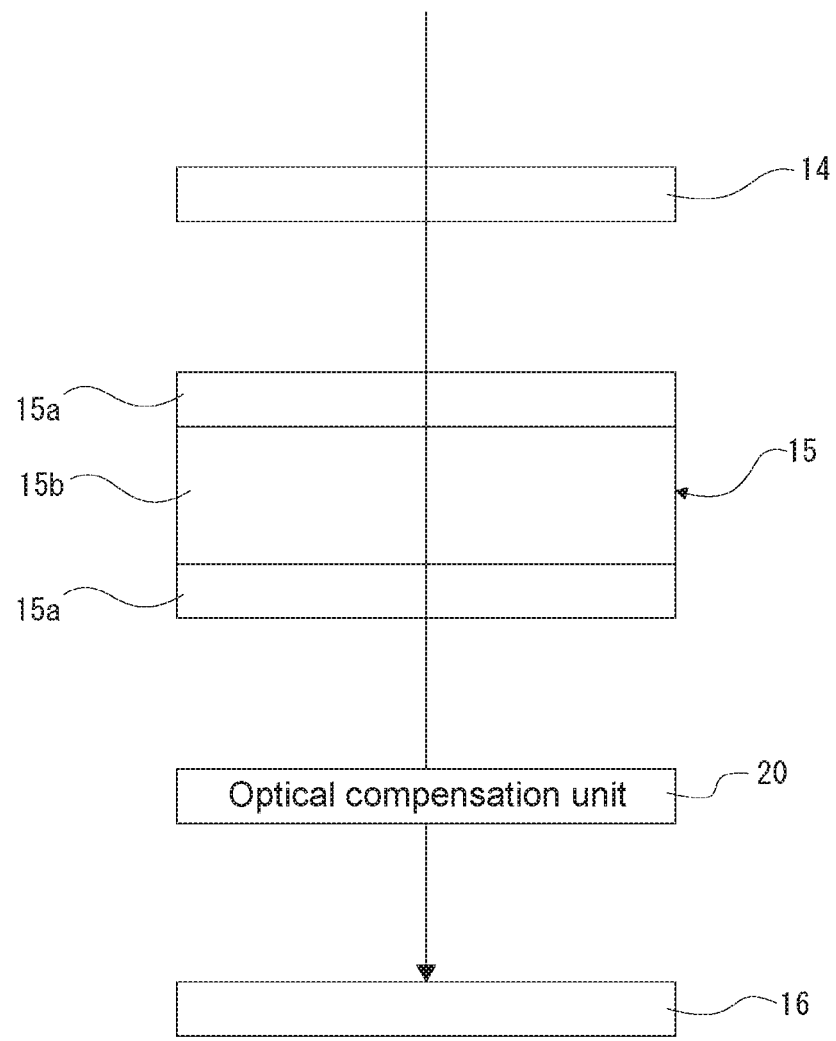
FIG. 2 A diagram for illustrating a configuration example of a main unit in the liquid-crystal display apparatus of the first embodiment.

FIG. 2 is a diagram for illustrating a configuration example of a main unit of the liquid-crystal display apparatus 1, and shows a magnified part from the incident-side polarizing plate 14 to the emission-side polarizing plate 16 provided for each of the RGB lights in the separation-composite optical system 7.

On an optical path of each of the RGB lights, the incident-side polarizing plate 14 and the emission-side polarizing plate 16 are arranged in the crossed Nicol state (state in which optical axes are orthogonal to each other). The liquid-crystal panel 15, which is a spatial light modulator, and the optical compensation unit 20 are arranged between the incident-side polarizing plate 14 and the emission-side polarizing plate 16. In the present embodiment, the optical compensation unit 20 is arranged between the liquid-crystal panel 15 and the emission-side polarizing plate 16.

Note that there may be the plurality of emission-side polarizing plates 16. Moreover, the incident-side polarizing plate 14 and the emission-side polarizing plate 16 may be organic polarizing plates or inorganic polarizing plates. However, when the inorganic polarizing plates are used, even in a case that, for example, a laser is used the light source Ls, and the amount of light from the light source Ls is large, (compared with organic polarizing plates) it is possible that a change in quality of the incident-side polarizing plate 14 and the emission-side polarizing plate 16 are suppressed, and longevity, an improvement in reliability, and the like may be achieved.

The liquid-crystal panel 15 includes a liquid-crystal layer 15b arranged between a pair of boards 15a and 15a, and functions as the spatial light modulator for transmission light by changing alignment of liquid crystal in the liquid-crystal layer 15b depending on applied voltage.

The liquid-crystal panel 15 of the present embodiment is assumed to be a vertical-alignment-type (VA-type: VA=Vertical Alignment) liquid-crystal panel. The VA-type liquid-crystal panel operates in a vertical alignment mode. In other words, the liquid-crystal panel 15 of the present embodiment is configured such that liquid-crystal alignment when voltage is not applied is substantially vertical to the board 15a, and the liquid-crystal alignment tilts with respect to a vertical direction (normal line direction: thickness direction) of the board 15a when the voltage is applied.

Figure 3:
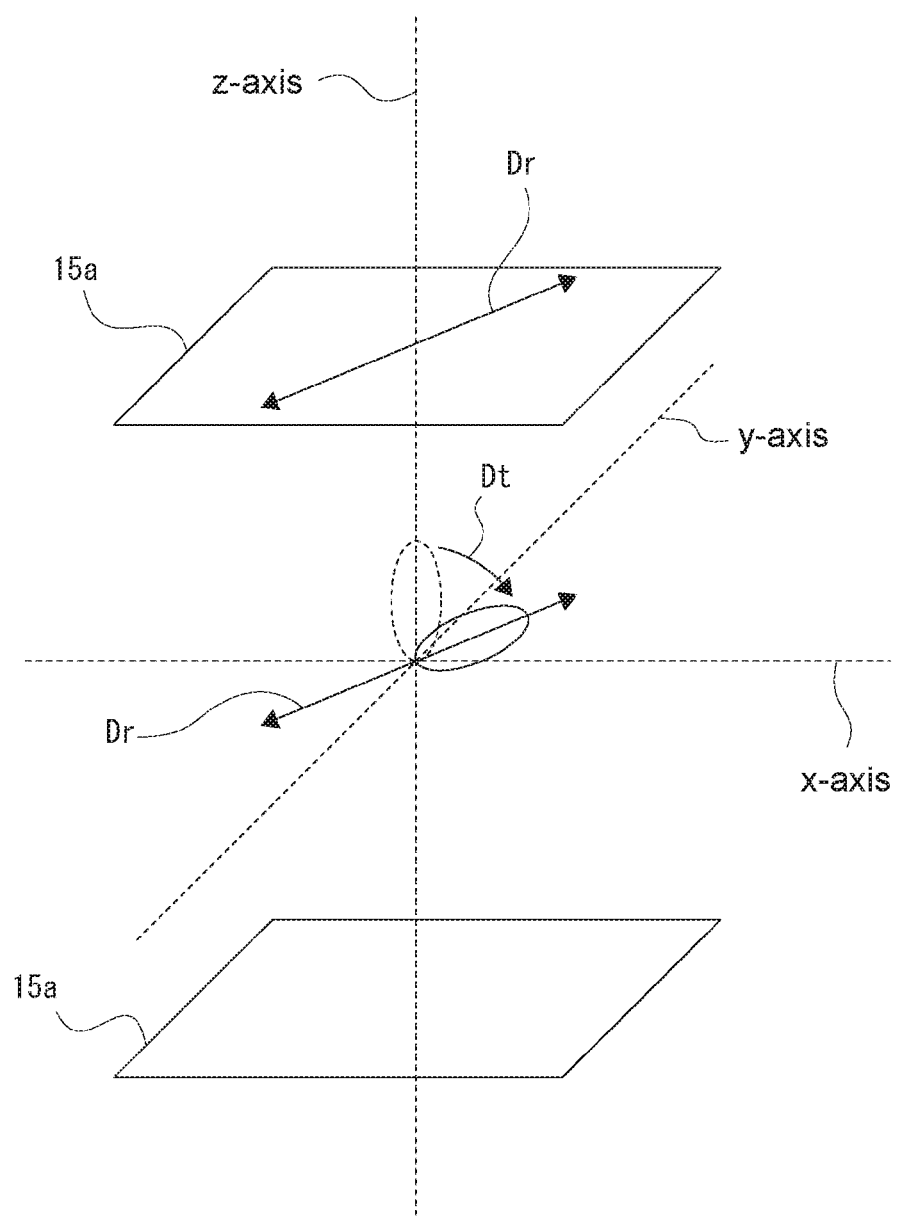
FIG. 3 A diagram for illustrating a tilt direction of liquid crystal.

FIG. 3 is a diagram for illustrating a tilt direction of the liquid crystal in the VA-type liquid-crystal panel.

First, as shown in FIG. 3, a direction orthogonal to the board 15a of the liquid-crystal panel 15 (thickness direction of the liquid-crystal panel 15) is defined as z-axis direction, and directions orthogonal to each other on a plane parallel to an on-plane direction of the board 15a are defined as x-axis direction and y-axis direction respectively.

As described above, in the VA-type liquid-crystal panel, the liquid-crystal alignment tilts with respect to the vertical direction of the board 15a when the voltage is applied, and at this time, directions in which liquid-crystal molecules tilt are directions along an alignment direction of an alignment film formed in the board 15a (hereinafter, written "rubbing direction Dr"). On the x-y-plane, when the x-axis direction is a direction of 0 to 180 degrees, and the y-axis direction is a direction of 90 to 270 degrees, the rubbing direction Dr is a direction of 45 degrees or 135 degrees (in FIG. 3, an example in which the rubbing direction Dr=45 degrees is assumed is shown).

In FIG. 3, an oval by a broken line shows the liquid-crystal molecules before the voltage is applied, and an oval by a solid line shows the liquid-crystal molecules after the voltage is applied respectively. Hereinafter, a direction in which the liquid-crystal molecules tilt depending on the applied voltage as described above (direction in which the liquid-crystal molecules rotate) is written "tilt direction Dt".

In a case that the liquid-crystal panel 15 is in a vertical alignment state in which the voltage is not applied to the liquid-crystal layer 15b (here, pretilt described below is not considered), linear polarization in the same polarization direction as linear polarization (in the present example, s-polarization), which is entered from the incident-side polarizing plate 14 in a predetermined polarization direction, travels via the liquid-crystal layer 15b and the optical compensation unit 20, and is emitted to the emission-side polarizing plate 16.

The emission-side polarizing plate 16 is in the crossed Nicol state with respect to the incident-side polarizing plate 14, and as described above, the polarization direction of the incident light via the liquid-crystal layer 15b is substantially orthogonal to a light transmission axis of the emission-side polarizing plate 16. As a result, the incident light does not pass through the emission-side polarizing plate 16. In other words, pixel information (black) based on the minimum gradation value is displayed by not applying the voltage to pixels of the liquid-crystal panel 15.

On the other hand, in a case that the voltage is applied to the liquid-crystal layer 15b, the liquid-crystal molecules tilt in the tilt direction Dt. At this time, a tilt angle of the liquid-crystal molecules in the tilt direction Dt may be controlled by adjusting a voltage value of the applied voltage.

When the applied voltage value is the maximum, the liquid-crystal alignment becomes horizontal alignment (in which the liquid-crystal molecules tilt from the z-axis direction to the tilt direction Dt by 90 degrees). In this state, the polarization direction of the incident linear polarization from the incident-side polarizing plate 14 is rotated by 90 degrees by birefringence in the liquid-crystal layer 15b after passing through the liquid-crystal layer 15b, and the linear polarization passes through the emission-side polarizing plate 16. Due to this, pixel information based on the maximum gradation value is displayed.

When the voltage value is less than the maximum value, the tilt angle of the liquid-crystal molecules in the tilt direction Dt is less than 90 degrees. In this state, the light that passes through the liquid-crystal layer 15b includes both a polarization component parallel to the polarization direction of the incident light and a polarization component orthogonal to the polarization direction of the incident light (that is, polarization of the light is oval polarization). Only the polarization component parallel to the light transmission axis of the emission-side polarizing plate 16 of the two polarization components is emitted from the emission-side polarizing plate 16. In this case, therefore, pixel information based on the middle gradation value is displayed.

Here, even in the case that the voltage is not applied, the liquid-crystal alignment of the actual liquid-crystal panel 15 is not completely orthogonal to the board 15a, and pretilt of about several degrees is given to the liquid-crystal alignment.

Figure 4:
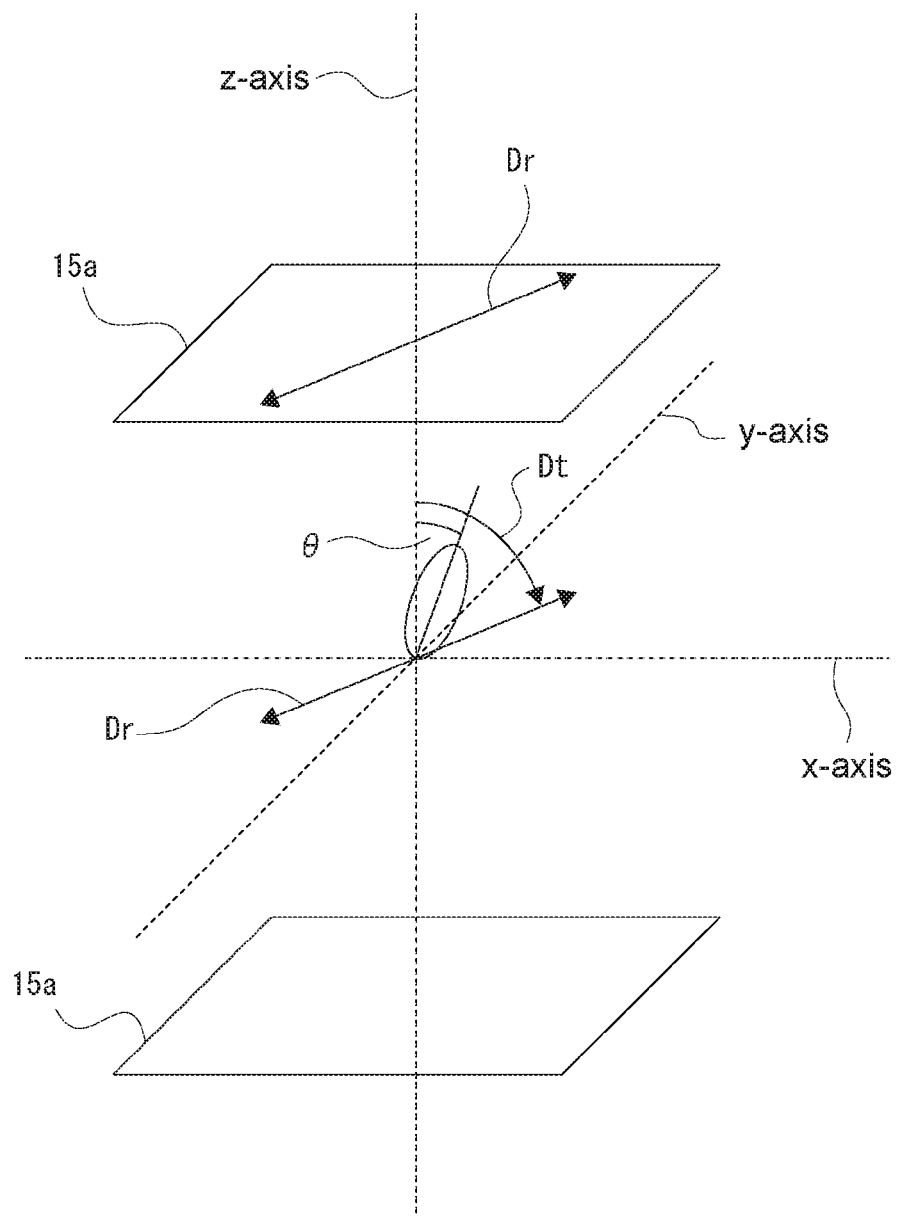
FIG. 4 A diagram for illustrating pretilt of the liquid crystal.

FIG. 4 is a diagram for illustrating pretilt of the liquid crystal in the VA-type liquid-crystal panel.

In the case that the voltage is not applied to the liquid-crystal panel 15, the liquid-crystal molecules in the liquid-crystal layer 15b tilt from the z-axis direction to the tilt direction Dt by a predetermined angle θ. Hereinafter, a pretilt angle of the liquid crystal expressed by the angle θ is written "pretilt angle θ".

By such pretilt, preventing production of a reverse tilt domain by which the liquid-crystal molecules tilt in the opposite direction to the predetermined direction (tilt direction Dt) when the voltage is applied may be achieved.

As described above, in a case that the liquid-crystal molecules are pretilt, when the voltage is not applied, that is, the black display is performed, the light that passes through the liquid-crystal layer 15b includes not only the polarization component parallel to the polarization direction of the incident light, but the polarization component orthogonal to the polarization direction of the incident light. Therefore, a part of the light that passes through the liquid-crystal layer 15b passes through the emission-side polarizing plate 16, and this causes light leakage when the black display is performed. As a result, lowering contrast is caused.

To achieve such prevention of light leakage when the black display is performed, it is effective that a negative C-plate, that is, a medium having a low refractive index is arranged in the thickness direction of the optical compensation unit 20.

The negative C-plate used in the present example (hereinafter, written "negative C-plate 23") does not include a negative one-axis crystal such as sapphire, but is structured as a plurality-film structure including an inorganic material. The plurality-film structure may be realized by forming the inorganic material on a clear board such as glass in a plurality of layers by coating such as sputtering or vapor deposition, for example. The plurality-film structure as the negative C-plate 23 may be formed by layering a high-refractive-index material and a low-refractive-index material alternately by using a dielectric.

Figure 5:
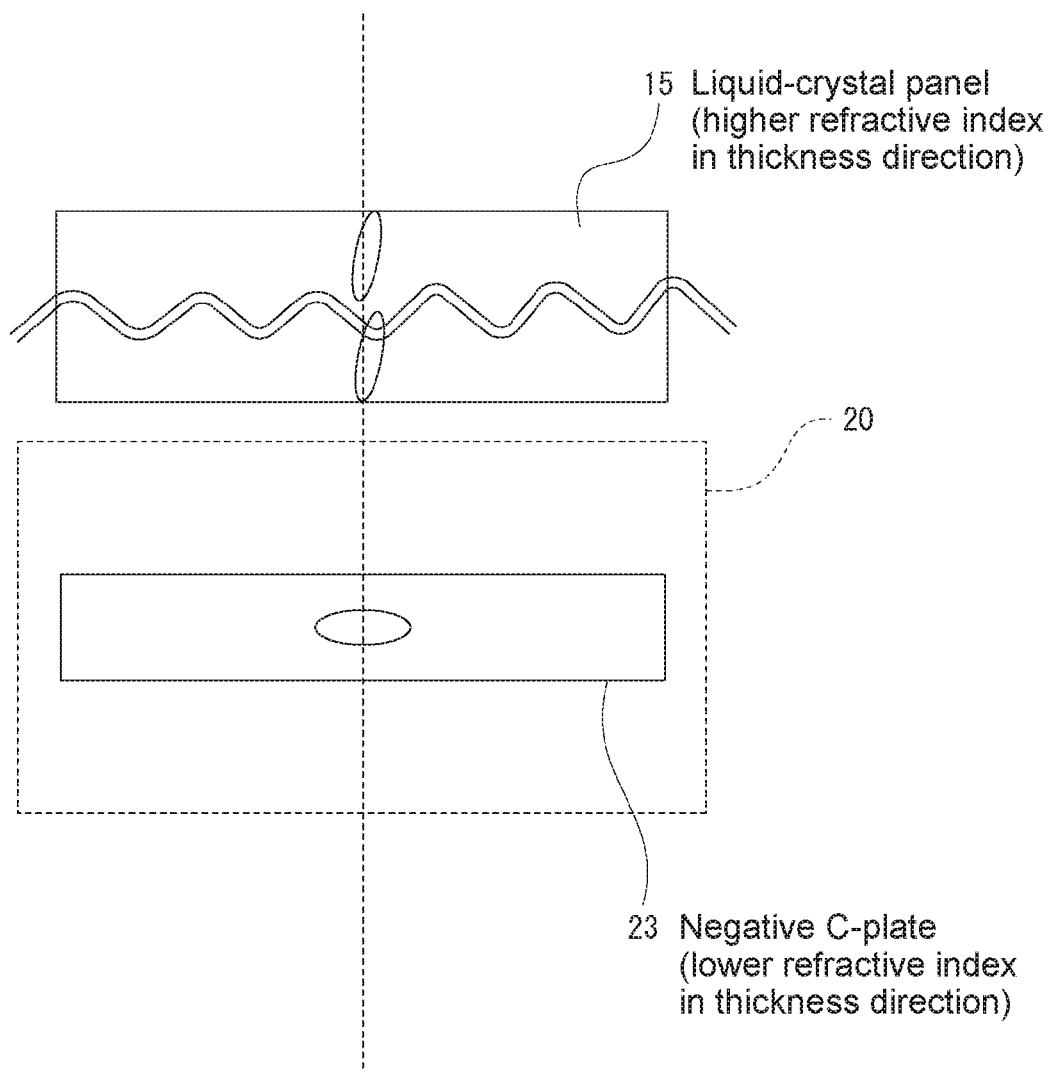
FIG. 5 A diagram schematically showing an operation of refractive-index ovals in a liquid-crystal layer and an operation of the refractive-index oval in a negative C-plate.

With reference to FIG. 5, an operation in a case that the negative C-plate 23 is provided will be described. Note that, in FIG. 5, an operation of refractive-index ovals of the liquid-crystal panel 15 (liquid-crystal layer 15b) and an operation of a refractive-index oval of the negative C-plate 23 are schematically shown, respectively.

First, the liquid-crystal layer 15b of the VA-type liquid-crystal panel 15 operates in the vertical alignment mode, and the liquid-crystal panel 15 may be modeled as a positive one-axis crystal. The liquid-crystal panel 15 in which the liquid-crystal molecules tilted by the pretilt angle θ when the voltage is not applied may be, that is, considered as the tilted positive C-plate. Here, the positive C-plate is assumed to be a medium, which has a refractive index that has isotropy on a plane, and has a higher refractive index in a thickness direction than the refractive index on the plane (in other words, medium having the higher refractive index in the thickness direction).

It is assumed that the negative C-plate 23 including a medium that has a lower refractive index in a thickness direction is used with the liquid-crystal panel 15 described above. Here, the medium that has the lower refractive index in the thickness direction is, in other words, the medium, which has a refractive index that has isotropy on a plane, and has the lower refractive index in the thickness direction than the refractive index on the plane.

When a light beam passes through the negative C-plate 23 that has the lower refractive index in the thickness direction, the negative C-plate 23 produces a phase difference, a sign of which is opposite to a sign of the liquid-crystal panel 15 as a positive C-plate.

Due to this, if each of optical axes of the liquid-crystal panel 15 and the negative C-plate 23 tilts in the same direction, a phase difference produced by the liquid-crystal panel 15 is opposite to the phase difference produced by the negative C-plate 23. Therefore, with respect to the phase difference produced by the liquid-crystal panel 15 and the phase difference produced by the negative C-plate 23, by adjusting thicknesses of the liquid-crystal panel 15 and the negative C-plate 23 respectively such that absolute values thereof are the same as each other, and by not producing a phase deviation between the incident-side polarizing plate 14 and the emission-side polarizing plate 16 in the crossed Nicol state, the phase difference produced by the liquid-crystal panel 15 may be offset by the phase difference produced by the negative C-plate 23.

In other words, by tilting and arranging the negative C-plate 23 in the same direction as the pretilted direction (tilt direction Dt) of the liquid-crystal panel 15, and by adjusting the thickness of the negative C-plate 23, the phase difference produced by the liquid-crystal panel 15 may be offset.

Here, the negative C-plate 23 will be modeled and described to further understand this.

Figure 6:
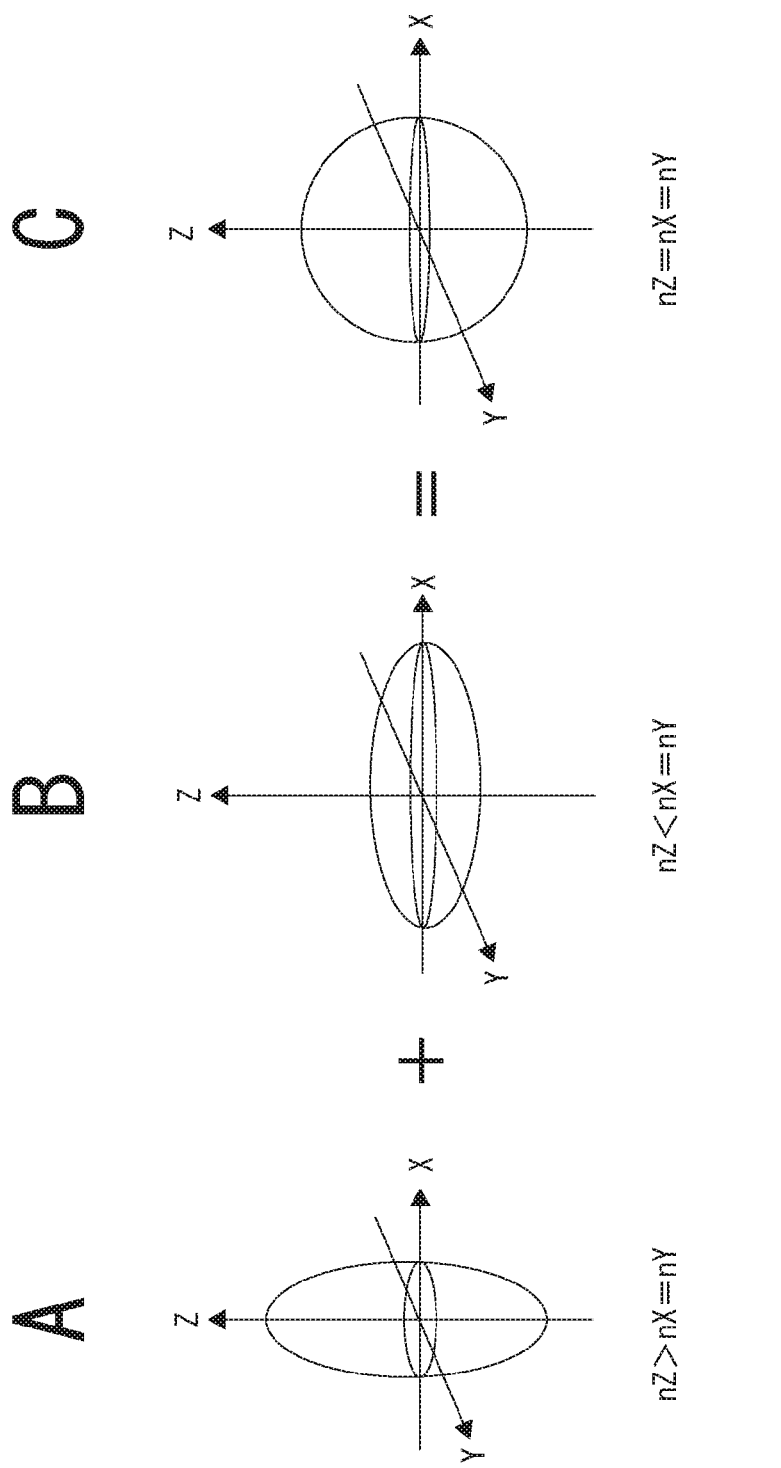
FIG. 6 A diagram for modeling and illustrating a specific example of optical compensation by the negative C-plate.

FIG. 6 is a diagram for modeling and illustrating a specific example of optical compensation by the negative C-plate 23. FIG. 6A models and shows the liquid-crystal panel 15, that is, the refractive-index oval showing the positive one-axis crystal, and FIG. 6B models and shows the negative C-plate 23, that is, the refractive-index oval having the lower refractive index in the thickness direction respectively. FIG. 6C models and shows a refractive-index oval formed by adding the refractive-index ovals in FIGS. 6A and 6B.

Note that, in each of FIGS. 6A to 6C, an X-axis, a Y-axis, and a Z-axis express three-dimensional directions of the refractive-index oval, and if the negative C-plate 23 is tilted and arranged in the same direction as the tilt direction Dt, the X-axis, the Y-axis, and the Z-axis will be different from the x-axis, the y-axis, and the z-axis (three axes based on the on-plane direction and the thickness direction of the liquid-crystal panel 15) in FIG. 3 and FIG. 4.

As described above, the liquid-crystal molecules are pretilted in the liquid-crystal panel 15, and the Z-axis in FIG. 6A is an axis tilting from the z-axis to the tilt direction Dt by the pretilt angle θ. The Z-axis in FIG. 6B coincides with the Z-axis in FIG. 6A, and this means that the negative C-plate 23 is tilted in the same direction (the same rotating direction) as the pretilted state with respect to a state in which the negative C-plate 23 is parallel to the liquid-crystal panel 15. Specifically, this means that the negative C-plate 23 is tilted from a direction parallel to the liquid-crystal panel 15 to the tilt direction Dt by the pretilt angle θ. The description described above is theoretical. However, in an actual design, the pretilt angle θ is not exactly the same due to a difference between refractive indexes of materials of the liquid crystal and the negative C-plate, and a value thereof varies slightly.

In FIG. 6A, the liquid-crystal panel 15, that is, the refractive-index oval showing the positive one-axis crystal has refractive indexes no of a normal light beam in the X-axis direction and the Y-axis direction equal to each other, and a refractive index ne of an abnormal light beam of the liquid-crystal panel 15 in the Z-axis direction is higher than the refractive index no of the normal light beam (no<ne). Therefore, where the refractive indexes n in the X-axis direction, the Y-axis direction, and the Z-axis direction are referred to as "nX", "nY", and "nZ" respectively, "nZ>nX=nY" can be written.

In FIG. 6B, the refractive-index oval of the negative C-plate 23 has the refractive indexes no of the normal light beam in the X-axis direction and the Y-axis direction equal to each other, and the refractive index ne of the abnormal light beam of the negative C-plate 23 in the Z-axis direction is lower than the refractive index no of the normal light beam (no>ne). In other words, in a relationship between the refractive indexes "nX", "nY", and "nZ" in the X-axis direction, the Y-axis direction, and the Z-axis direction, "nZ<nX=nY" can be written.

Where the refractive-index ovals in FIGS. 6A and 6B are added, as shown in FIG. 6C, the refractive-index oval is an isotropic body ("nZ=nX=nY") apparently. With respect to light in any direction, the refractive indexes of the normal light beam and the abnormal light beam are equal to each other (no=ne), and the phase difference is not produced. At this time, each of phase difference amounts is determined by "Δn (difference between ne and no)×thickness". The Δn is determined by a physical-property value, and the phase difference amount may be determined by adjusting the thickness.

2. Phase Compensation as Embodiment

As described above, by tilting and arranging the negative C-plate 23 including the medium that has the lower refractive index in the thickness direction in the same direction as the pretilted direction of the liquid-crystal panel 15, and by adjusting the thickness of the negative C-plate 23, a phase deviation produced in the liquid-crystal panel 15 may be offset.

However, tilting and arranging the negative C-plate 23 causes the optical system to be larger, and is not desirable. Therefore, in the present example, a compensation method in which the negative C-plate 23 is not tilted and arranged is employed.

Figure 7:
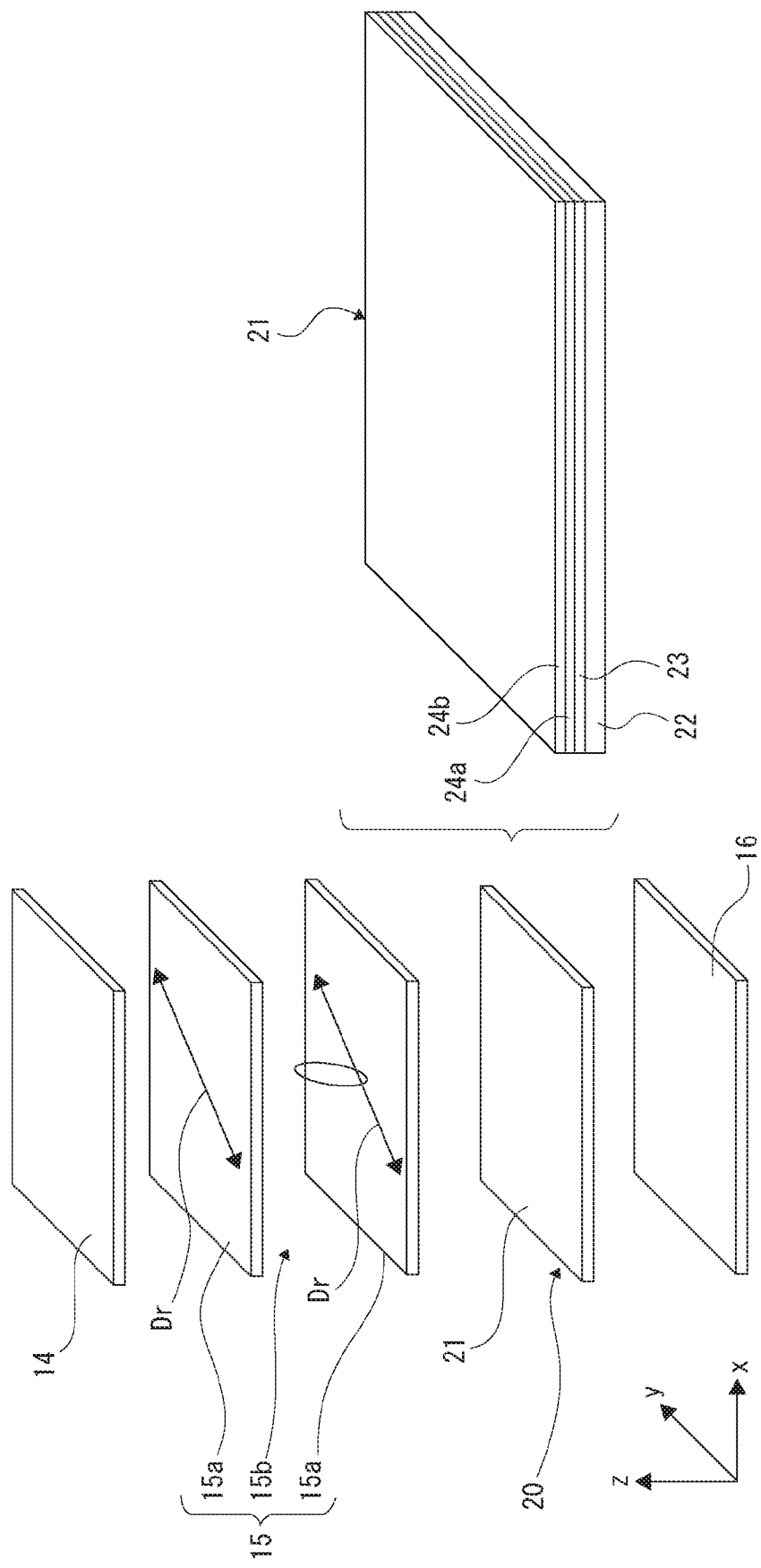
FIG. 7 A diagram for illustrating a configuration example of an optical compensation unit of an embodiment.

FIG. 7 is a diagram for illustrating a configuration example of the optical compensation unit 20 in the present embodiment.

As shown in FIG. 7, the negative C-plate 23 and two O-plates of an O-plate 24a and an O-plate 24b are provided in the optical compensation unit 20 of the present example. Specifically, the optical compensation unit 20 of the present example includes one optical compensation plate 21 in which the negative C-plate 23, the O-plate 24a, and the O-plate 24b are layered on a transparent board 22 made of grass, for example, in order from the board 22 side.

Here, the O-plate is an optical medium in which an N1 axis having the highest refractive index tilts with respect to a thickness direction thereof when the O-plate is shown by a refractive-index oval, and the O-plate is formed out of film deposition by rhombic vapor deposition.

In the present example, the optical compensation plate 21 is arranged parallel to the liquid-crystal panel 15.

Hereinafter, in a case that the O-plate 24a and the O-plate 24b are not particularly distinguished, the O-plate 24a and the O-plate 24b are written "0-plate 24". Moreover, the O-plate 24a and the O-plate 24b are sometimes written "two O-plates 24" generically.

Note that the optical compensation plate 21 is not limited to a structure in which the two O-plates 24 are layered on the negative C-plate 23 as shown in FIG. 7. Other structures such as a structure in which the one compensation plate, which is obtained by forming the O-plate 24a on one of a surface or a back surface of a transparent board made of grass, for example, and by forming the O-plate 24b on the other of the surface or the back surface of the transparent board by rhombic vapor deposition respectively, is attached to and integrated with the other compensation plate that is obtained by forming the negative C-plate 23 on the board 22 may be employed. In the present embodiment, the structure of the optical compensation plate 21 may be a structure in which at least the one negative C-plate 23 and the two O-plates 24 are included.

Figure 8:
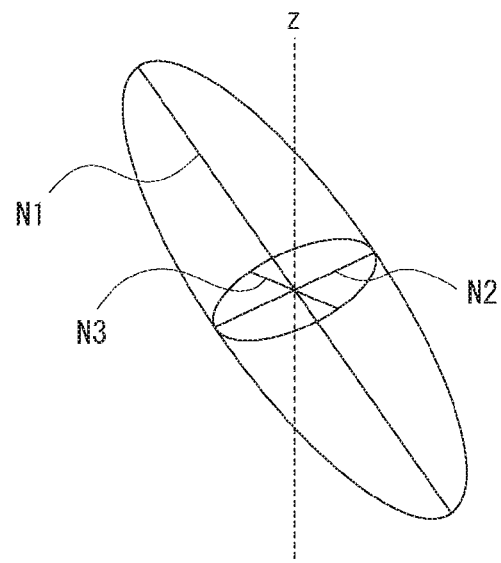
FIG. 8 A diagram showing an O-plate shown by the refractive-index oval.

FIG. 8 is a diagram showing the O-plate 24 shown by the refractive-index oval.

As shown in FIG. 8, the N1 axis having the highest refractive index is tilted with respect to the z-axis direction in the refractive-index oval of the O-plate 24.

In the refractive-index oval of the O-plate 24, axes that are orthogonal to the N1 axis and each other on a plane are referred to as N2 axis and N3 axis, respectively.

Here, in Patent Literature 1, the compensation plate obtained by combining the two O-plates with the negative C-plate is disclosed as described above. However, only the on-plane phase difference (=front phase difference) that is produced by the refractive-index oval projected on the surface of the O-plate and the phase difference Rth in the thickness direction (in Patent Literature 1, both are defined as retardation) are presented, and suitable compensation for the oblique light component, that is, the component of the light entering at the angle tilting with respect to the thickness direction is not described. Even if the front phase difference and the phase difference Rth in the thickness direction are designed to suit the phase difference produced in the liquid crystal, it will be difficult that the phase difference produced by the oblique light at each of the incident angles is suitably offset.

In recent years, in the liquid-crystal display apparatus 1 for a business use purpose, for example, a divergence angle in a lighting system is relatively large for improving brightness of a display image, and performing the compensation for the oblique light is important. Moreover, in a case that the liquid-crystal panel 15 includes an ML (microlens), an angle at which light passes through the liquid crystal is larger, and as a result, the compensation for the oblique light is particularly important.

Therefore, in the present embodiment, a method for suitably offsetting the phase difference, which is produced by the oblique light in the liquid-crystal panel 15 in which the liquid crystal is pretilted, by using the optical compensation plate 21 described above will be proposed.

First, because the compensation is for the phase difference originated and produced by pretilt of the liquid crystal, ideally, a condition described below may be satisfied to suitably offset the phase difference produced by the oblique light. In other words, the condition is that an amount of a composite phase difference between the two O-plates 24 and the negative C-plate 23 (that is, composite phase difference of the optical compensation plate 21) in a tilt-direction cross section that is a cross section parallel to the tilt direction Dt is same as an amount of a phase difference produced by light having each of incident angles in a predetermined incident-angle range in the liquid-crystal panel 15, and a sign of the composite phase difference is opposite to a sign of the phase difference.

Figure 9:
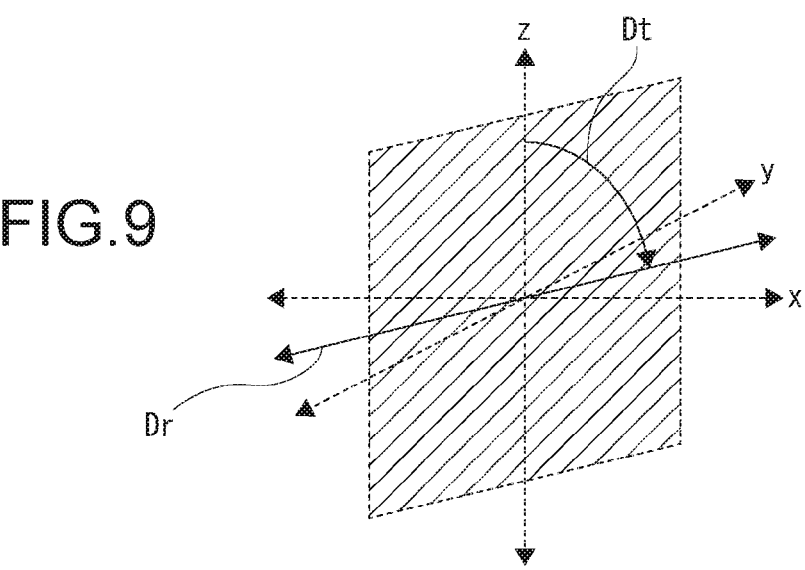
FIG. 9 A diagram for illustrating a tilt-direction cross section.

FIG. 9 is a diagram for illustrating "tilt-direction cross section" in the condition.

As shown in FIG. 9, the tilt-direction cross section is, in other words, a cross section parallel to the rubbing direction Dr and the z-axis direction (thickness direction).

Moreover, in the condition, the predetermined incident-angle range means a range of the incident angle that needs compensation substantially. In other words, the incident angle that is not produced or rarely produced in the configuration of the actual optical system is excluded from the condition for compensation. The predetermined incident-angle range in the present example is assumed to be, for example, a range in which an absolute value of the incident angle (deg) is from 15 or less to 30 or less.

Figure 10:
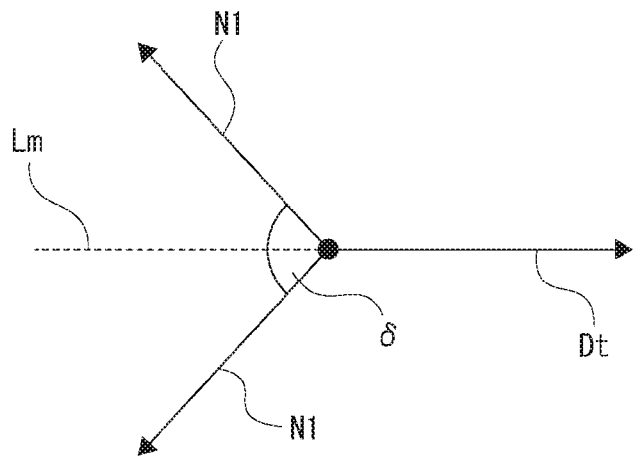
FIG. 10 A diagram showing a setting example of directions of N1 axes in the O-plate.

Here, when the phase difference originated and produced by pretilt of the two O-plates 24 is compensated, as disclosed in Patent Literature 1, it is suitable that the N1 axis of the two O-plates 24 is turned to a direction shown in FIG. 10.

In FIG. 10, each of the directions of the N1 axes of the two O-plates 24 shown by "N1" is shown as a direction in a case that the N1 axis is projected on the x-y-plane. Similarly, the tilt direction Dt in FIG. 10 is shown as a direction in a case that the tilt direction Dt is projected on the x-y-plane.

As shown in FIG. 10, it is suitable that the N1 axes of the two O-plates 24 are turned in the directions such that an angle δ formed by the N1 axes is 90 degrees, and a median Lm of the angle δ is parallel and opposite to the tilt direction Dt.

In the optical compensation plate 21 in the present example, the directions of the N1 axes of the two O-plates 24 are set such that the condition is generally satisfied. However, the condition is not exactly satisfied.

On the basis of the assumption, a method in which the composite phase difference of the optical compensation plate 21 is suited to the oblique light will be described.

Figure 11:
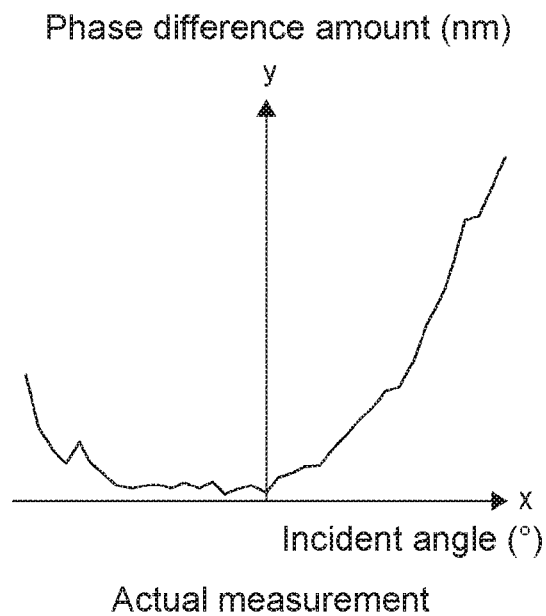
FIG. 11 A graph showing a measurement result of phase difference amounts produced by light that passes through the liquid-crystal panel.

FIG. 11 shows a measurement result of the phase difference amounts produced by light that enters the liquid-crystal panel 15 at each of incident angles in the tilt-direction cross section. Here, a range of the incident angle is from −20 degrees to +20 degrees.

Therefore, a changing property of the phase difference amount with respect to the incident angle of the liquid-crystal panel 15 is not a parabola, and alternatively, it is possible that the phase difference amount is approximated as a quadratic curve expressed by an [Equation 1] described below.

$$y=Ax^2+Bx+C \qquad \text{[Equation 1]}$$

Where x is the incident angle, y is the phase difference amount, and A>0, B>0, C>0.

On the other hand, a changing property of the phase difference amount of the negative C-plate 23 in the tilt-direction cross section can be expressed as a parabola by an [Equation 2] descried below.

$$y=ax^2 \qquad \text{[Equation 2]}$$

Where a<0.

Furthermore, although a changing property of each of the composite phase differences of the two O-plates 24 in the tilt-direction cross section is actually not a complete straight line, the changing property is assumed to be approximated as a straight line expressed by an [Equation 3] described below.

$$y=bx+c \qquad \text{[Equation 3]}$$

Figure 12:
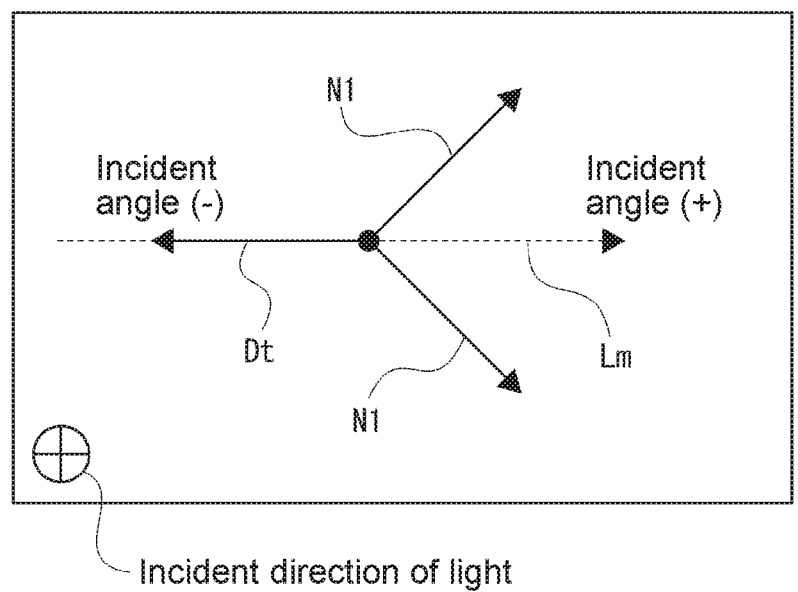
FIG. 12 A diagram showing a definition example of an incident direction of light at measurement of the phase difference amount.

Here, in the [Equation 3], a sign (positive or negative) of an inclination coefficient b varies by a direction of a sample measurement. In the present example, as shown in FIG. 12, an incident direction of light is defined (mark showing the incident direction in FIG. 12 means that the light travels from the front side to the back side of the paper), and in this case, b<0. Moreover, about an intercept c in the [Equation 3], c<0.

Figure 13:
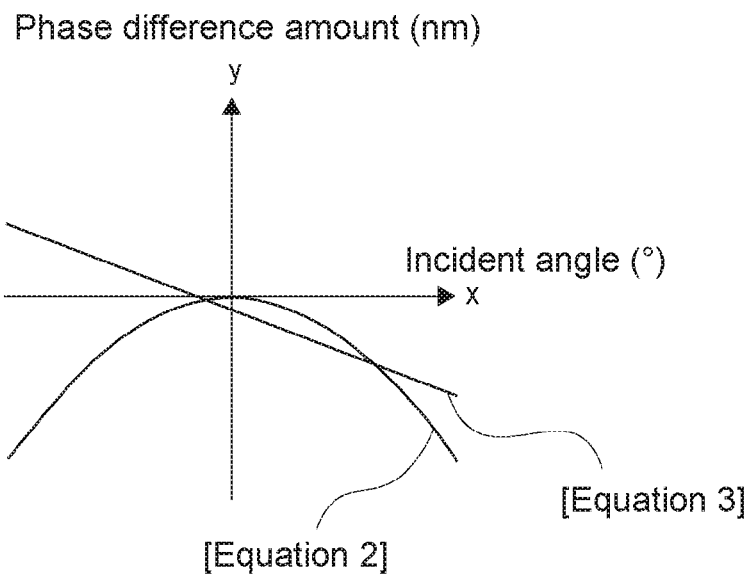
FIG. 13 Graphs showing an example of a phase-difference changing property of the negative C-plate and a composite-phase-difference changing property of the two O-plates with respect to incident angles.

FIG. 13 shows graphs of the [Equation 2] and the [Equation 3].

A changing property of the composite phase difference of the optical compensation plate 21, that is, the composite phase difference between the two O-plates 24 and the negative C-plate can be expressed by an [Equation 4] that is obtained by adding the [Equation 2] and the [Equation 3] described below.

$$y=ax^2+bx+c \qquad \text{[Equation 4]}$$

Figure 14:
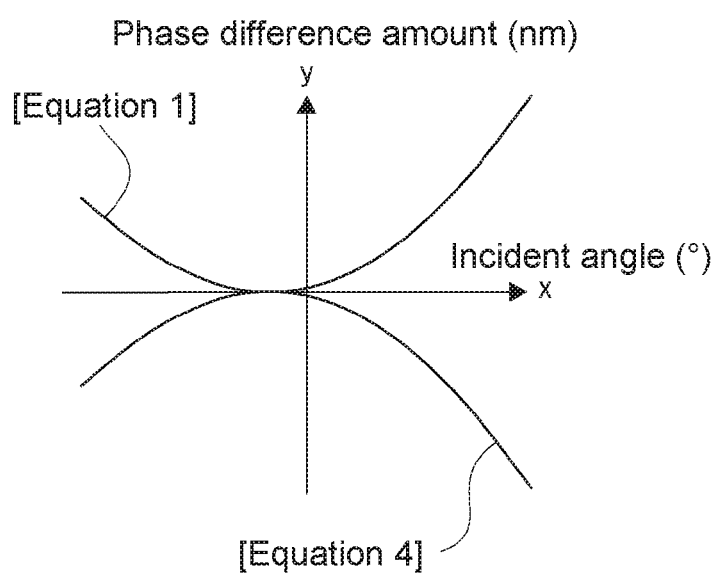
FIG. 14 Graphs exemplifying a relationship between the phase difference changing property on a side of the liquid-crystal panel and the composite phase difference changing property on a side of an optical compensation plate with respect to the incident angles.

FIG. 14 shows graphs of the [Equation 4] and the [Equation 1].

As shown in FIG. 14, to offset the phase difference produced by the oblique light by the composite phase difference of the optical compensation plate 21, a curve of the composite phase difference that is expressed by the [Equation 4] may be symmetrical about a curve on the liquid-crystal panel 15 side that is expressed by the [Equation 1].

In other words, a condition of an [Equation 5] described below may be satisfied.

$$A>0,B>0,C>0,a<0,b<0,c<0,|A|=|a|,|B|=b,|C|=|c| \qquad \text{[Equation 5]}$$

The condition of the [Equation 5] means that absolute values of the phase difference amounts are the same as each other, and signs of the phase difference amounts are opposite to each other.

On the basis of the [Equation 1] to [Equation 5], with respect to an incident angle, the phase difference amount that is aimed for in the negative C-plate 23 and the composite phase difference amount that is aimed for in the two O-plates 24 can be obtained respectively.

As an example, first, the incident angle and the phase difference amounts of the liquid-crystal panels 15 (that is, x and y) are three-point-sampled, and the three points are substituted for the [Equation 1] to obtain A, B, and C. On the basis of the condition of the [Equation 5], a, b, and c can be obtained.

By substituting a for the [Equation 2], the phase difference amount that is aimed for in the negative C-plate 23 can be obtained.

Moreover, by substituting b and c for the [Equation 3], the composite phase difference amount that is aimed for in the two O-plates 24 can be obtained.

Note that, actually, an error is produced in the measurement and a simulation, and as a result, determining a in advance is more preferable than solving simultaneous equations by directly substituting the three points x and y for the [Equation 1] like the method. As a yardstick for determining a in the case, it is preferable that the value y is suited to be the phase difference amount produced by the liquid crystal that is not pretilted at an incident angle (x=15 degrees), and is obtained. In other words, the phase difference amount of the negative C-plate 23 is suited to the liquid crystal in advance. In the case, the [Equation 3], which is obtained by subtracting the [Equation 2] from the [Equation 4], is the composite phase difference amount that is aimed for in the two O-plates 24.

However, even in such a case that a is estimated, it is necessary that a condition described below is considered.

$$y\_Max=0 \qquad \text{[Equation 6]}$$

Theoretically, seen in the pretilted direction, the phase difference of the liquid crystal is 0. Therefore, it is necessary that the phase difference of the optical compensation plate 21 is also 0 at the incident angle.

Here, the [Equation 4] is converted to an [Equation 7] described below.

[Math. 1]

$$y = a\left(x^2 + \frac{b}{a}x + \frac{c}{a}\right)$$
$$= a\left\{\left(x + \frac{b}{2a}\right)^2 - \frac{b^2}{4a^2} + \frac{c}{a}\right\}$$

[Equation 7]

Therefore, where y is the Max, $x=-b/2a$.

At this time, where y=0, y=0 and $x=-b/2a$ are substituted for the [Equation 7], and

[Math. 2]

$$0 = a\left\{\left(-\frac{b}{2a} + \frac{b}{2a}\right)^2 - \frac{b^2}{4a^2} + \frac{c}{a}\right\}$$
$$0 = -\frac{b^2}{4a} + c$$

As a result, $$c = b^2/4a \quad \text{[Equation 8]}$$

Where the value a is substituted for the [Equation 4], the [Equation 4] is an equation of b, c, x, and y. The equation is referred to as [Equation 4']. Where desired x and y are substituted for the [Equation 4'], the [Equation 4'] is an equation of b and c. The equation is referred to as [Equation 4"].

Moreover, where a is substituted for the [Equation 8], the [Equation 8] is an [Equation 8'] of b and c. Where the [Equation 8'] is substituted for the [Equation 4"], and after b is obtained by the equation of only b, c is obtained.

c is often considered the front phase difference of the liquid crystal, and it is more preferable that the value c is determined to satisfy the condition of the [Equation 8] than a case that c=the front phase difference produced by liquid-crystal pretilt where x=0 is directly considered. When the value c is too high without considering the condition of the [Equation 8], the value y_Max is negative, and an unnecessary phase difference is produced.

Here, an error is produced in the simulation and the actual measurement. Therefore, it is preferable that several samples are made around the phase difference that is aimed for and obtained by the method described above, and are discerned.

The method in which the phase difference produced by the oblique light is suitably offset is described above. However, when phase compensation for light that passes through the liquid-crystal panel 15 is performed, it is considerable that the pretilt angle θ varies from a designed value.

With respect to the variation of the pretilt angle θ, there are a High panel in which a fall of liquid crystal is smaller on the basis of a Typical panel of a design center, and a Low panel in which a fall of liquid crystal is larger on the basis of the Typical panel. For example, in a case that the phase difference amount is suited to the Typical panel, the phase difference is suited with pinpoint, and lowering contrast in another liquid-crystal panel 15 is caused.

In a case that such a variation of the pretilt angle θ cannot be absorbed, it is necessary that the optical compensation plates 21 that suit phase differences of the Typical panel, the High panel, and the Low panel respectively are made. As a result, it takes time and cost.

Therefore, in the present embodiment, a variation of a compensation effect with respect to the phase difference that is produced by the oblique light and is originated by the variation of the pretilt angle θ is suppressed. In other words, the variation of the compensation effect may be absorbed.

To achieve this, not in the tilt-direction cross section, but in the cross section orthogonal to the tilt-direction cross section, the phase difference amount produced by each of the incident angles is focused on. Specifically, when phase differences of the liquid-crystal panel 15 with respect to the same incident angles on a positive side and on a negative side are compared with the composite phase difference of the optical compensation plate 21 in the cross section orthogonal to the tilt-direction cross section, a magnitude relationship between an absolute value of the phase difference with respect to the incident angle on the positive side and an absolute value of the phase difference with respect to the incident angle on the negative side is the same as a magnitude relationship between on a side of the liquid-crystal panel 15 and on a side of the optical compensation 21 (side of the composite phase difference).

In other words, on the comparison, in a case that the phase difference of the liquid-crystal panel 15 on the positive side is larger, the composite phase difference of the optical compensation plate 21 on the positive side is also made to be larger. On the contrary, on the comparison, in a case that the phase difference of the liquid-crystal panel 15 on the negative side is larger, the composite phase difference of the optical compensation plate 21 on the negative side is also made to be larger.

In this manner, tendencies of the phase difference produced at the incident angle on the positive side and the phase difference produced at the incident angle having the same absolute value on the negative side are coincided with each other between the side of the liquid-crystal panel 15 and the side of the optical compensation plate 21.

Here, in this case, the incident angle is in a predetermined incident-angle range in which a compensation is substantially necessary (for example, the absolute value is from 15 or less to 30 or less).

The phase difference originated and produced by pretilt of the liquid crystal is compensated by the O-plate 24 (if the liquid crystal does not tilt, the phase difference will be compensated by only the negative C-plate 23). Therefore, only the phase difference in the tilt direction (phase difference in the tilt-direction cross section) is often focused on. However, by considering a direction that does not tilt, specifically, the phase difference in the cross section orthogonal to the tilt-direction cross section, increasing contrast may be achieved.

A condition in which the tendency of the phase differences on the side of the liquid-crystal panel 15 and on the side of the optical compensation plate 21 is varied is confirmed by a simulation.

When the phase difference of the liquid crystal in the tilt direction Dt is suited by the two O-plates 24 on the basis of the equations described above, there are three parameters. In other words, the parameters are an inclination angle of the N1 axis of the O-plate 24, a film thickness, and the angle δ formed by the two O-plates 24. Of these parameters, the inclination angle of the N1 axis has little degree of freedom due to limitation of a vapor deposition apparatus or a jig tool. In a case that the film thicknesses of the two O-plates 24 are set to generally the same, further adjustment is performed to the angle δ formed by the two O-plates 24. As an example, a simulation in which the N1 axis direction of the one of the two O-plates 24 is fixed, and the N1 axis direction of the other of the two O-plates 24 is rotated on a plane. As a result, in a case that the angle δ formed by the N1 axes of the two O-plates 24 (Twist angle) is smaller than 80 degrees, the tendencies of the phase difference in the cross section orthogonal to the tilt-direction cross section are opposite to each other between the panel and the compensation plate (at this time, each of the refractive indexes of the O-plate 24 is calculated where N1>N2>N3). In other words, the magnitude relationship between the absolute value of the phase difference with respect to the incident angle on the positive side and the absolute value of the phase difference with respect to the incident angle on the negative side is opposite to the magnitude relationship between on the side of the liquid-crystal panel 15 and on the side of the optical compensation 21. At this time, the phase differences in the tilt-direction cross section are generally the same.

Note that the Twist angle is an example, and in a case that the refractive index of the O-plate 24 varies by a vapor deposition material, the optimal angle δ for variation absorb vary, and the optimal angle δ also varies by setting of the film thickness of each of the O-plates 24. It is important that when the phase differences in the tilt-direction cross section are suited to be the same, the tendency of the phase difference in the cross section orthogonal to the tilt-direction cross section is also suited.

By employing the method, absorption of the variation of the compensation effect that is originated by the variation of the pretilt angle θ may be achieved.

Actually, an experiment in which the two O-plates 24 and the one negative C-plate 23 are formed on separate boards and the phase difference is measured in a state of piling up the three compensation plates in total is performed. In the actual measurement, it is also confirmed that in a case that the angle δ formed by the two O-plates 24 varies, the similar variation to the variation in the simulation is produced.

Note that, in the present example, an LCD MASTER manufactured by SHINTECH Inc. is used in the simulation. Moreover, an AxoScan manufactured by AXOMETRICS Inc. is used in the actual measurement of the phase difference (measurement by Total Retardance).

The present applicant repeats trial manufacture of the optical compensation plate 21 on the basis of a design idea described above, and achieves the optical compensation plate 21 having a fine compensation efficiency.

Figure 15:
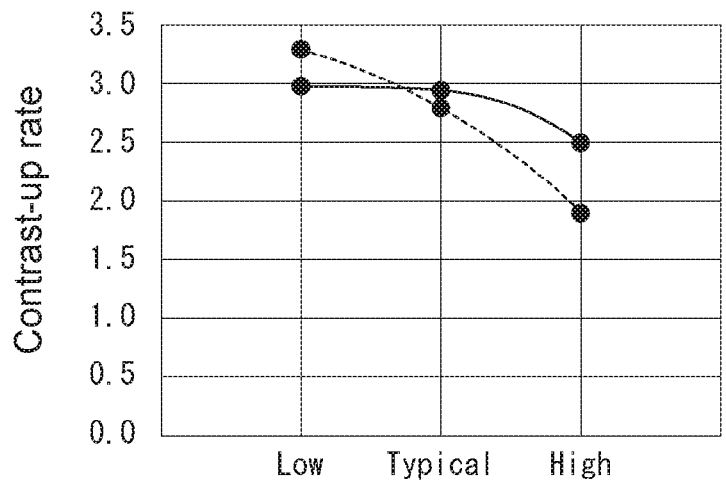
FIG. 15 A diagram showing a contrast-evaluated result about an optical compensation apparatus of the embodiment.

With reference to FIG. 15, a contrast-evaluated result about the optical compensation plate 21 will be described.

In FIG. 15, the broken line shows a measurement result of a contrast-up rate about the optical compensation plate 21 that optimizes the phase difference in the tilt-direction cross section on the basis of the equations described above (that is, offsetting the phase difference produced by the oblique light is attempted). Here, the contrast-up rate is a value of prime contrast, that is, the contrast-up rate in a case that contrast is "1" when phase compensation is not performed.

Moreover, the solid line in FIG. 15 shows a measurement result of the contrast-up rate about the optical compensation plate 21 that optimizes the phase difference in the tilt-direction cross section and the formed angle δ (optimization of the phase difference in the cross section orthogonal to the tilt-direction cross section).

Figure 16:
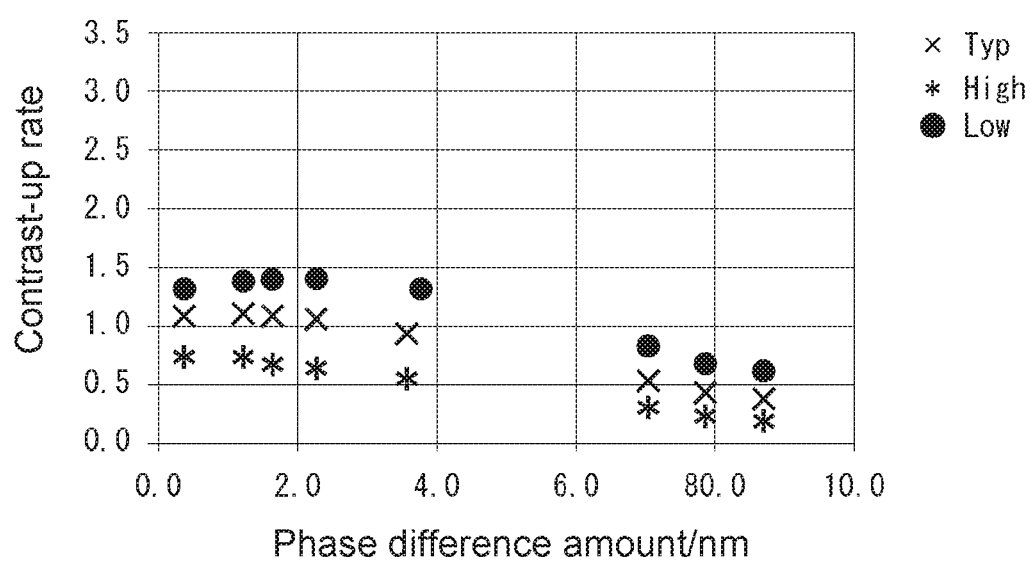
FIG. 16 A diagram showing a contrast evaluated result about an optical compensation apparatus that is made on the basis of a method of the prior art.

Here, as comparison, FIG. 16 shows an evaluated result of contrast about the prior art. In FIG. 16, the contrast-up rates of each of the Typical panel, the High panel, and the Low panel about a sample that is made on the basis of the method disclosed in Patent Literature 1 in which the two O-plates are used when the front phase difference amounts described above are given are shown. Note that, with respect to each of the samples used in FIG. 16, the phase difference Rth of the thickness direction is suited to the phase difference Rth in the liquid-crystal panel 15, and the phase difference amount of the negative C-plate is determined to be predetermined.

As shown in FIG. 16, by the method in Patent Literature 1 in which only the front phase difference is suited, the contrast-up rate is about 1.4 by the Low panel as the maximum value, is about 1.2 by the Typical panel, and is about 0.7 by the High panel.

On the other hand, as shown by the broken line in FIG. 15, with respect to the optical compensation plate 21 in a case that only the method in which the phase difference in the tilt-direction cross section is optimized is employed, the contrast-up rate is about 3.3 by the Low panel, is about 2.8 by the Typical panel, and is about 1.9 by the High panel.

And as shown by the solid line in FIG. 15, with respect to the optical compensation plate 21 in a case that the phase difference in the tilt-direction cross section and the phase difference in the cross section orthogonal to the tilt-direction cross section are attempted to be optimized, the contrast-up rate is about 3.0 by the Low panel, is about 3.0 by the Typical panel, and is about 2.5 by the High panel.

By the results, it is known that an improvement in contrast is achieved by optimizing the phase difference in the tilt-direction cross section and by suitably offsetting the phase difference produced by the oblique light.

Moreover, it is also known that the variation of the compensation effect of the phase difference produced by the oblique light may be absorbed by optimizing the phase difference in the cross section orthogonal to the tilt-direction cross section. By the result in FIG. 15, it is known that the contrast-up rate in this case may be kept about 3.0 by the Typical panel and by the Low panel, and may also be ensured 2.5 times or more by the High panel.

Here, a property of the optical compensation plate 21 when a contrast efficiency shown by the solid line in FIG. 15 is obtained is expressed by the approximate equation of the [Equation 3]. As described above, the approximate equation is the approximate equation obtained by linearly approximating the changing property of the composite phase difference of the two O-plates 24 in the tilt-direction cross section with respect to an incident angle.

Figure 17:
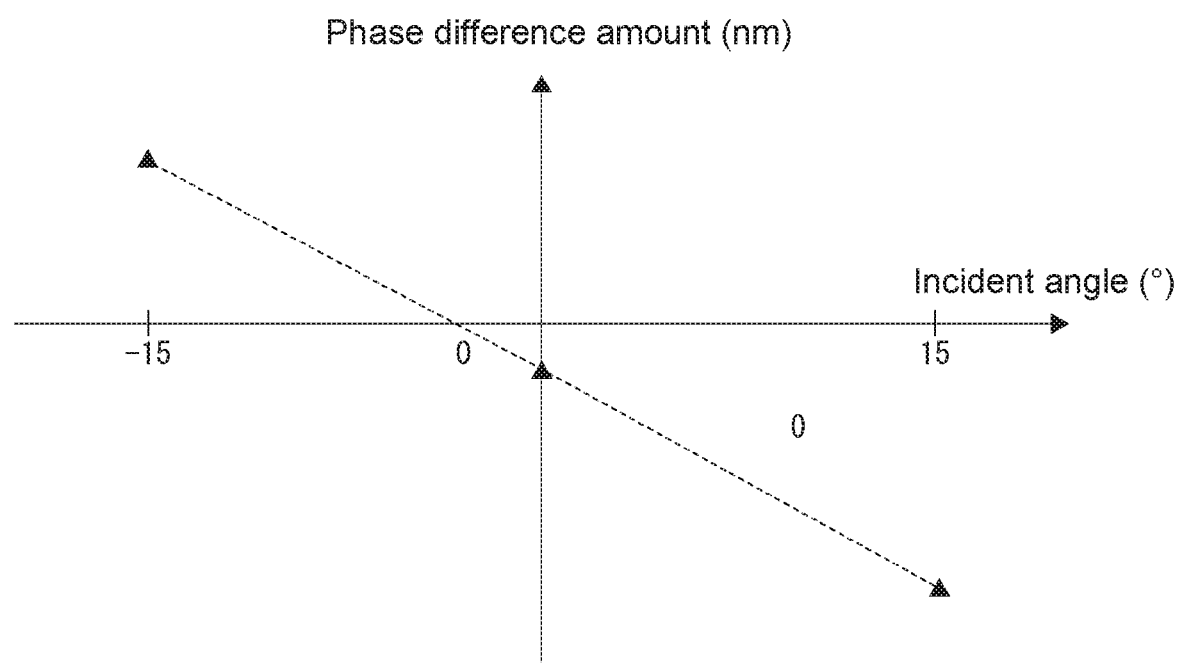
FIG. 17 A graph showing an example of an approximate equation that expresses a property of the optical compensation apparatus of the embodiment.

In the approximate equation about the optical compensation plate 21 in a case that the evaluated result shown by the solid line in FIG. 15 is obtained, an absolute value of the inclination coefficient b is 0.5 where a significant figure is to the first decimal place. At this time, the sign of the phase difference of the liquid-crystal panel 15 is positive. Therefore, the intercept c in the approximate equation is negative. FIG. 17 shows a graph of the approximate equation at this time.

Note that the inclination coefficient b is obtained by performing actual measurement of the phase differences of the sample of the target optical compensation plate 21 in a case that the incident angle is 15 degrees, 0 degree, and −15 degrees, and by linearly approximating the actual measurement result of the three points. Note that the inclination coefficient b sometimes varies from the actual measurement due to a difference of simulation conditions, and the values of the actual measurement are employed.

At this time, the AxoScan described above is used in the actual measurement of the phase difference (measurement by Total Retardance).

On the other hand, with respect to a case that the method in FIG. 16 in which the front phase difference is suited is employed, the absolute value of the inclination coefficient b in the approximate equation in a case that the front phase difference amount is optimized is 0.7, similarly where the significant figure is to the first decimal place.

Here, if a panel design varies, the designed value of the pretilt angle θ of the liquid crystal may also vary. Moreover, if the pretilt angle θ varies, an optimal value of the inclination coefficient b may also vary. In a case that the designed value of the pretilt angle θ that may be employed in the panel design is assumed to be relatively narrow, and the actual variation of the pretilt angle θ with respect to the designed value is also assumed to be relatively narrow, it is desirable that the absolute value of the inclination coefficient b is 0.6 or less, which is a median value of FIGS. 15 and 16. Note that b≠0 (because it is desirable that the phase difference amount varies with respect to the variation of the incident angle).

Moreover, in a case that the designed value of the pretilt angle θ that may be employed in the panel design is assumed to be relatively wide, and the actual variation of the pretilt angle θ with respect to the designed value is also assumed to be relatively wide, it is desirable that the absolute value of the inclination coefficient b is not 0, and 0.65 or less.

Moreover, when the evaluated result shown by the solid line in FIG. 15 is obtained, the phase difference amount of the negative C-plate with respect to the incident angle 15 degrees is substantially 10 nm. Considering a difference of the panel designs, it is desirable that the phase difference amount of the negative C-plate with respect to the incident angle 15 degrees is 20 nm or less, which is twice the result.

3. Modified Example

The example in which the two O-plates 24 and the negative C-plate 23 are integrated with each other to form the one optical compensation plate 21 is described above. Alternatively, a part or all of the two O-plates 24 and the negative C-plate 23 may be separated as separate compensation plates.

Figure 18:
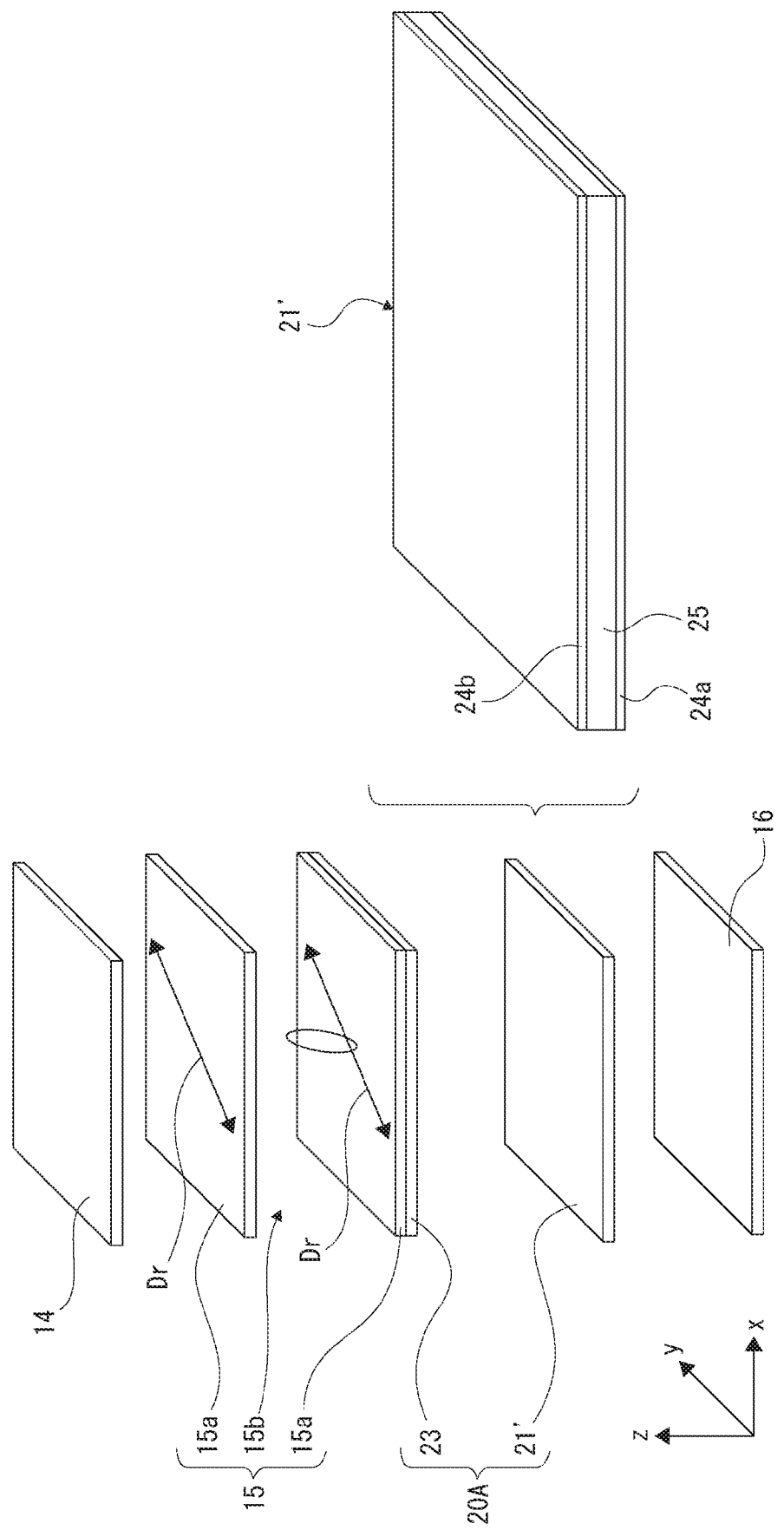
FIG. 18 A diagram for illustrating a modified example in which a part or all of the two O-plates and the negative C-plate are separated and formed as separate compensation plates.

FIG. 18 shows an example of this.

As shown in FIG. 18, in an optical compensation unit 20A in this case, the negative C-plate 23 is separated from an optical compensation plate 21'. In this case, the negative C-plate 23 is formed and integrated with the board 15a in the liquid-crystal panel 15 (the board 15a of the two boards 15a on a side near the emission-side polarizing plate). Moreover, as shown in FIG. 18, the optical compensation plate 21' is located between the negative C-plate 23 and the emission-side polarizing plate 16, and is a structure in which a rhombic vapor deposition layer as the O-plate 24a and a rhombic vapor deposition layer as the O-plate 24b are formed on a surface and a back surface of a common board 25 respectively.

Note that, although the description by a drawing is omitted, the O-plate 24a, the O-plate 24b, and the negative C-plate 23 are not necessarily arranged between the liquid-crystal panel 15 and the emission-side polarizing plate 16, and alternatively, at least a part of the O-plate 24a, the O-plate 24b, and the negative C-plate 23 may be arranged between the liquid-crystal panel 15 and the incident-side polarizing plate 14. For example, it is possible that the compensation plate in which the two O-plates 24 are formed such as the optical compensation plate 21' in FIG. 18 is arranged between the liquid-crystal panel 15 and the emission-side polarizing plate 16, and the compensation plate in which the negative C-plate 23 is formed is arranged between the liquid-crystal panel 15 and the incident-side polarizing plate 14. Alternatively, it is also possible that the compensation plate in which the O-plate 24a is formed and the compensation plate in which the O-plate 24b is formed are separated and arranged between the liquid-crystal panel 15 and the emission-side polarizing plate 16, and between the liquid-crystal panel 15 and the incident-side polarizing plate 14 respectively, and the compensation plate in which the negative C-plate 23 is formed is arranged between either the liquid-crystal panel 15 and the emission-side polarizing plate 16, or the liquid-crystal panel 15 and the incident-side polarizing plate 14. At this time, the one O-plate 24 and the negative C-plate 23 may be integrated with each other.

In FIG. 18, the example in which the negative C-plate 23 and the liquid-crystal panel 15 are formed and integrated with each other is shown. Alternatively, a part or all of the negative C-plate 23, the O-plate 24a, and the O-plate 24b may be formed and integrated with any one of the liquid-crystal panel 15, the incident-side polarizing plate 14, or the incident-side polarizing plate 15.

For example, an example in which the negative C-plate 23 and the two O-plates 24 are formed and integrated with the emission-side polarizing plate 16, or the like may be taken.

Moreover, as described above, the example in which the present technology is applied to the liquid-crystal display apparatus 1 provided with the transmission-type liquid-crystal panels 15 is shown. Alternatively, the present technology is also preferably applicable to a liquid-crystal display apparatus 1A provided with reflective-type liquid-crystal panels 15'.

Figure 19:
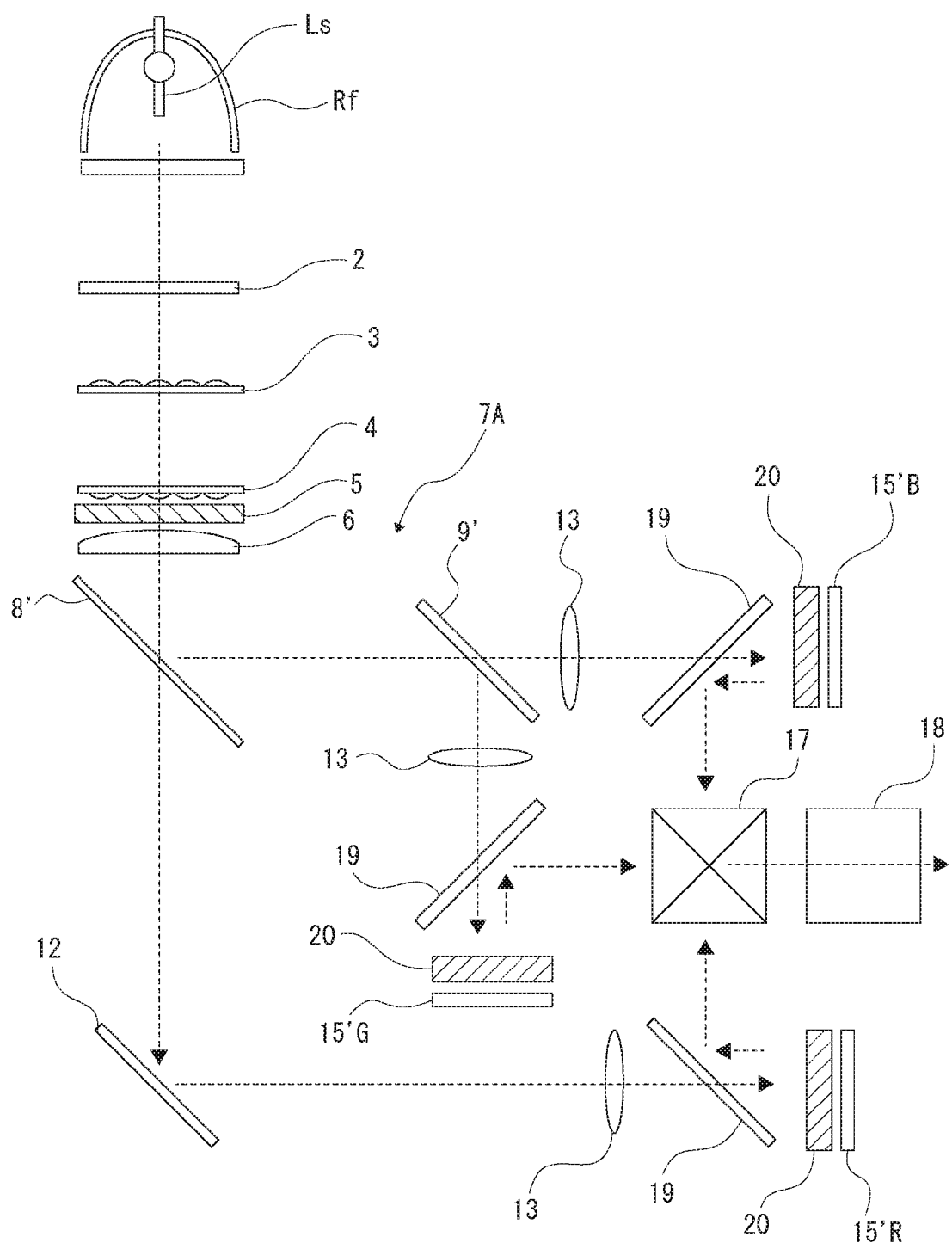
FIG. 19 A diagram showing a configuration example of a reflective-type liquid-crystal display apparatus to which the optical compensation apparatus of the embodiment is applied.

FIG. 19 is a diagram showing a configuration example of the liquid-crystal display apparatus 1A.

The liquid-crystal display apparatus 1A applies the optical compensation units 20 in a case that a configuration of reflective-type liquid crystal in which light that passes through the liquid-crystal layer 15b is reflected by a mirror, and is allowed to pass through the liquid-crystal layer 15b again is employed.

A difference between the liquid-crystal display apparatus 1A and the liquid-crystal display apparatus 1 in FIG. 1 is that a separation-composite optical system 7A is provided instead of the separation-composite optical system 7. In the separation-composite optical system 7A, a dichroic mirror 8' and a dichroic mirror 9' are provided instead of the dichroic mirror 8 and the dichroic mirror 9. Moreover, in the separation-composite optical system 7A, three liquid-crystal panels 15'R, 15'G, and 15'B corresponding to the R light, the G light, and the B light respectively are provided as the reflective-type liquid-crystal panels 15'. Furthermore, in the separation-composite optical system 7A, reflective-type polarizing plates 19 (wire grid) are provided as polarizing plates provided with the liquid-crystal panels 15'R, 15'G, and 15'B respectively.

With respect to the incident light from the condenser lens 6, the dichroic mirror 8' allows the R light to pass therethrough, and reflects the G light and the B light. The dichroic mirror 9' allows the G light and the B light reflected by the dichroic mirror 8' to enter, allows the B light to pass therethrough, and reflects the G light. As a result, the emitted light from the condenser lens 6 is color-separated into the R light, the G light, and the B light.

The R light that passes through the dichroic mirror 8' enters a reflective-type polarizing plate 19 for the R light after reflected by the mirror 12 and traveling via the condenser lens 13 for the R light. The G light reflected by the dichroic mirror 9' enters the reflective-type polarizing plate 19 for the G light after traveling via the condenser lens 13 for the G light. Moreover, the B light that passes through the dichroic mirror 9' enters the reflective-type polarizing plate 19 for the B light after traveling via the condenser lens 13 for the B light.

In the present example, the emitted light from the condenser lens 6 is assumed to be p-polarization by an operation of the polarization-conversion element 5. Each of the reflective-type polarizing plates 19 for the R light, the G light, and the B light is configured to allow p-polarization to pass therethrough and to reflect s-polarization. Therefore, with respect to each of the R light, the B light, and the G light, the light that enters the reflective-type polarizing plate 19 from the condenser lens 13 passes through the reflective-type polarizing plate 19.

With respect to each of the R light, the B light, and the G light, the light that passes through the reflective-type polarizing plate 19 as described above enters the liquid-crystal panel 15'R, 15'G, or 15'B via the optical compensation unit 20 (optical compensation plate 21) for the R light, the B light, or the G light, respectively.

In each of the liquid-crystal panels 15', a mirror that reflects light passing through the liquid-crystal layer 15b (not shown in FIG. 19) is formed on the opposite side to the incident surface of the light, and the light, which passes through the reflective-type polarizing plate 19 and enters the liquid-crystal panel 15', passes through the liquid-crystal layer 15b, is reflected by the mirror, passes through the liquid-crystal layer 15b again, and enters the reflective-type polarizing plate 19.

With respect to each of the R light, the B light, and the G light, a part of light entering the reflective-type polarizing plate 19 from a side of the liquid-crystal panel 15', that is, each of s-polarized components is reflected by the reflective-type polarizing plate 19, and as shown in FIG. 19, each of the s-polarized components enters the color-composite prism 17. The color-composite prism 17 emits the incident R light, the incident G light, and the incident B light to the projective lens 18 respectively.

Note that the reflective-type liquid-crystal display apparatus 1A is also not limited to the configuration in which the two O-plates 24 and the negative C-plate 23 are integrated with each other to form the optical compensation plate 21, and alternatively, a part or all of the two O-plates 24 and the negative C-plate 23 may be separated and formed as separate compensation plates. Moreover, a part or all of the two O-plates 24 and the negative C-plate may be formed and integrated with the liquid-crystal panel 15' or the reflective-type polarizing plate 19.

Note that, as described above, the example in which the wire-grid-type polarizing plate is used as the reflective-type polarizing plate 19 is taken, and alternatively, a PBS (polarization beam splitter) may be used.

Here, each of the configurations of the optical systems of the liquid-crystal display apparatuses 1 and 1A described above is only taken as an example, and for example, various optical elements that are not shown may be arranged (for example, MLs are arranged on the side of each of the incident surfaces of the liquid-crystal panels 15 and 15').

4. Summary of Embodiment

As described above, the optical compensation apparatus of the embodiment (optical compensation units 20 and 20A) includes the negative C-plate (23) and the two O-plates (24), the amount of the composite phase difference between the two O-plates and the negative C-plate in the tilt-direction cross section is substantially same as the amount of the phase difference produced by the light having each of the incident angles in the predetermined incident-angle range in the liquid-crystal panel, and the sign of the composite phase difference is opposite to the sign of the phase difference, the tilt-direction cross section being the cross section parallel to the tilt direction of the liquid crystal in the vertical-alignment-type liquid-crystal panel (15 and 15').

Due to this, it is possible that the phase difference produced by the oblique light is suitably offset in the liquid-crystal panel.

Therefore, the improvement in contrast may be achieved.

Moreover, in the optical compensation apparatus of the embodiment, the absolute value of the inclination coefficient of the composite phase difference between the two O-plates in the tilt-direction cross section in the approximate equation obtained by approximating the changing property of the composite phase difference with respect to the incident angle linearly is not 0, and is 0.65 or less.

Here, if the panel design varies, the designed value of the pretilt angle of the liquid crystal may also vary. Moreover, if the pretilt angle varies, the optimal value of the inclination coefficient may also vary. By the setting of the inclination coefficient described above, it is possible that the phase difference produced by the oblique light is suitably offset by corresponding to the case that the range of the designed value of the pretilt angle that may be employed in the panel design is relatively wide, and furthermore, the actual variation of the pretilt angle with respect to the designed value is relatively large.

Therefore, the improvement in contrast may be achieved.

Furthermore, in the optical compensation apparatus of the embodiment, the absolute value of the inclination coefficient is not 0, and is 0.6 or less.

Due to this, it is possible that the phase difference produced by the oblique light is suitably offset by corresponding to the case that the range of the designed value of the pretilt angle that may be employed in the panel design is relatively narrow, and the actual variation of the pretilt angle with respect to the designed value is relatively small.

Therefore, the improvement in contrast may be achieved.

In addition, in the optical compensation apparatus of the embodiment, the phase difference amount with respect to the 15-degree incident angle of the negative C-plate is 20 nm or less.

Due to this, it is possible that the phase difference produced by the oblique light is suitably offset.

Therefore, the improvement in contrast may be achieved.

Furthermore, in the optical compensation apparatus of the embodiment, when the phase differences of the liquid-crystal panel with respect to the same incident angles on the positive side and on the negative side are compared with the composite phase difference in the cross section orthogonal to the tilt-direction cross section, the magnitude relationship between the absolute value of the phase difference with respect to the incident angle on the positive side and the absolute value of the phase difference with respect to the incident angle on the negative side is the same as the magnitude relationship between on the side of the liquid-crystal panel and on the side of the composite phase difference.

Due to this, it is possible that the variation of the compensation effect that is originated by the variation of the pretilt angle and is about the phase difference produced by the oblique light is absorbed.

Therefore, the improvement in contrast may be achieved.

Moreover, it becomes unnecessary that the separate optical compensation apparatuses are made for the liquid-crystal panels having the different pretilt angles respectively. As a result, reducing cost may be achieved.

Moreover, in the optical compensation apparatus (optical compensation unit 20) of the embodiment, the two O-plates and the negative C-plate are formed as the integrated optical compensation plate (21).

Due to this, reducing the number of parts and miniaturizing the optical system by integrated formation may be achieved.

Furthermore, in the optical compensation apparatus (optical compensation unit 20A) of the embodiment, a part or all of the two O-plates and the negative C-plate are separated and formed as the separate compensation plates.

Due to this, the degree of freedom of arrangement of the compensation plate may be improved. For example, the compensation plate in which the two O-plates are formed and the compensation plate in which the negative C-plate is formed may be separately arranged on the front and the back of the liquid-crystal panel on the optical path from the light source. Alternatively, the compensation plate in which the one O-plate is formed and the compensation plate in which the other O-plate is formed may be separately arranged on the front and the back of the liquid-crystal panel on the optical path, and the compensation plate in which the negative C-plate is formed may be arranged on the front or the back of the liquid-crystal panel on the optical path, or the like.

Therefore, an improvement in the degree of freedom of optical-system design may be achieved.

Furthermore, in the optical compensation apparatus of the embodiment, a part or all of the two O-plates and the negative C-plate are formed and integrated with the liquid-crystal panel or the polarizing plate.

Due to this, reducing the number of the parts and miniaturizing the optical system by integrated formation may be achieved. Particularly, by forming and integrating all of the two O-plates and the negative C-plate with the liquid-crystal panel or the polarizing plate, it becomes unnecessary that the optical compensation plate for improving contrast is separately provided with respect to the liquid-crystal panel and the polarizing plate. As a result, the reducing effect of the number of the parts may be increased, and the further miniaturization of the optical system may be achieved.

The liquid-crystal display apparatus (1 or 1A) of the embodiment includes the vertical-alignment-type liquid-crystal panel (15 and 15') and the optical compensation unit (20 and 20A) including the negative C-plate and the two O-plates, and in the optical compensation unit, the amount of the composite phase difference between the two O-plates and the negative C-plate in the tilt-direction cross section is substantially same as the amount of the phase difference produced by the light having each of the incident angles in the predetermined incident-angle range in the liquid-crystal panel, and the sign of the composite phase difference is opposite to the sign of the phase difference, the tilt-direction cross section being the cross section parallel to the tilt direction of the liquid crystal in the liquid-crystal panel.

The similar operation and effect to the optical compensation apparatus of the embodiment may be obtained by the liquid-crystal display apparatus of the embodiment.

Moreover, in the liquid-crystal display apparatus (1) of the embodiment, the liquid-crystal panel (15) is the transmission-type liquid-crystal panel.

Due to this, it is possible that the phase difference produced by the oblique light is suitably offset in the liquid-crystal panel by corresponding to the case that the transmission-type liquid-crystal panel is employed.

Therefore, the improvement in contrast may be achieved.

Furthermore, in the liquid-crystal display apparatus (1A) of the embodiment, the liquid-crystal panel (15') is the reflective-type liquid-crystal panel.

Due to this, it is possible that the phase difference produced by the oblique light is suitably offset in the liquid-crystal panel by corresponding to the case that the reflective-type liquid-crystal panel is employed.

Therefore, the improvement in contrast may be achieved.

Moreover, in the liquid-crystal display apparatus of the embodiment, the absolute value of the inclination coefficient of the composite phase difference between the two O-plates in the tilt-direction cross section in the approximate equation obtained by approximating the changing property of the composite phase difference with respect to the incident angle linearly is not 0, and is 0.65 or less.

Due to this, it is possible that the phase difference produced by the oblique light is suitably offset by corresponding to the case that the range of the designed value of the pretilt angle that may be employed in the panel design is relatively wide, and the actual variation of the pretilt angle with respect to the designed value is relatively large.

Therefore, the improvement in contrast may be achieved.

Furthermore, in the liquid-crystal display apparatus of the embodiment, the absolute value of the inclination coefficient is not 0, and is 0.6 or less.

Due to this, it is possible that the phase difference produced by the oblique light is suitably offset by corresponding to the case that the range of the designed value of the pretilt angle that may be employed in the panel design is relatively narrow, and the actual variation of the pretilt angle with respect to the designed value is relatively small.

Therefore, the improvement in contrast may be achieved.

Furthermore, in the liquid-crystal display apparatus of the embodiment, the phase difference amount with respect to the 15-degree incident angle of the negative C-plate is 20 nm or less.

Due to this, it is possible that the phase difference produced by the oblique light is suitably offset.

Therefore, the improvement in contrast may be achieved.

Furthermore, in the liquid-crystal display apparatus of the embodiment, when the phase differences of the liquid-crystal panel with respect to the same incident angles on the positive side and on the negative side are compared with the composite phase difference in the cross section orthogonal to the tilt-direction cross section, the magnitude relationship between the absolute value of the phase difference with respect to the incident angle on the positive side and the absolute value of the phase difference with respect to the incident angle on the negative side is the same as the magnitude relationship between on the side of the liquid-crystal panel and on the side of the composite phase difference.

Due to this, it is possible that the variation of the compensation effect that is originated by the variation of the pretilt angle and is about the phase difference produced by the oblique light is absorbed.

Therefore, the improvement in contrast may be achieved.

Moreover, it becomes unnecessary that the separate optical compensation apparatuses are made for the liquid-crystal panels having the different pretilt angles respectively. As a result, reducing cost may be achieved.

Moreover, in the liquid-crystal display apparatus of the embodiment, as exemplified as the optical compensation unit 20, the two O-plates and the negative C-plate are formed as the integrated optical compensation plate (21).

Due to this, reducing the number of parts and miniaturizing the optical system by integrated formation may be achieved.

Furthermore, in the liquid-crystal display apparatus of the embodiment, as exemplified as the optical compensation unit 20A, a part or all of the two O-plates and the negative C-plate are separated and formed as the separate compensation plates.

Due to this, the degree of freedom of arrangement of the compensation plate may be improved. For example, the compensation plate in which the two O-plates are formed and the compensation plate in which the negative C-plate is formed may be separately arranged on the front and the back of the liquid-crystal panel on the optical path from the light source. Alternatively, the compensation plate in which the one O-plate is formed and the compensation plate in which the other O-plate is formed may be separately arranged on the front and the back of the liquid-crystal panel on the optical path, and the compensation plate in which the negative C-plate is formed may be arranged on the front or the back of the liquid-crystal panel on the optical path, or the like.

Therefore, the improvement in the degree of freedom of the optical-system design may be achieved.

Furthermore, in the liquid-crystal display apparatus of the embodiment, a part or all of the two O-plates and the negative C-plate are formed and integrated with the liquid-crystal panel or the polarizing plate.

Due to this, reducing the number of the parts and miniaturizing the optical system by integrated formation may be achieved. Particularly, by forming and integrating all of the two O-plates and the negative C-plate with the liquid-crystal panel or the polarizing plate, it becomes unnecessary that the optical compensation plate for improving contrast is separately provided with respect to the liquid-crystal panel and the polarizing plate. As a result, the reducing effect of the number of the parts may be increased, and the further miniaturization of the optical system may be achieved.

Note that the various effects described in the present specification are merely examples and not limitative, and other effects may be exerted.

5. Present Technology

Note that the present technology may also employ the following configurations.

(1)

An optical compensation apparatus, including:
a negative C-plate; and
two O-plates, in which
an amount of a composite phase difference between the two O-plates and the negative C-plate in a tilt-direction cross section is substantially same as an amount of a phase difference produced by light having each of incident angles in a predetermined incident-angle range in the liquid-crystal panel, and a sign of the composite phase difference is opposite to a sign of the phase difference, the tilt-direction cross section being a cross section parallel to a tilt direction of liquid crystal in a vertical-alignment-type liquid-crystal panel.

(2)

The optical compensation apparatus according to (1), in which
an absolute value of an inclination coefficient of a composite phase difference between the two O-plates in the tilt-direction cross section in an approximate equation obtained by approximating a changing property of the composite phase difference with respect to an incident angle linearly is not 0, and is 0.65 or less.

(3)

The optical compensation apparatus according to (2), in which
the absolute value of the inclination coefficient is not 0, and is 0.6 or less.

(4)

The optical compensation apparatus according to (2) or (3), in which
a phase difference amount with respect to a 15-degree incident angle of the negative C-plate is 20 nm or less.

(5)

The optical compensation apparatus according to any one of (1) to (4), in which
when phase differences of the liquid-crystal panel with respect to the same incident angles on a positive side and on a negative side are compared with the composite phase difference in a cross section orthogonal to the tilt-direction cross section, a magnitude relationship between an absolute value of the phase difference with respect to the incident angle on the positive side and an absolute value of the phase difference with respect to the incident angle on the negative side is the same as a magnitude relationship between on a side of the liquid-crystal panel and on a side of the composite phase difference.

(6)

The optical compensation apparatus according to any one of (1) to (5), in which
the two O-plates and the negative C-plate are formed as an integrated optical compensation plate.

(7)

The optical compensation apparatus according to any one of (1) to (5), in which
a part or all of the two O-plates and the negative C-plate are separated and formed as separate compensation plates.

(8)

The optical compensation apparatus according to any one of (1) to (5), in which
a part or all of the two O-plates and the negative C-plate are formed and integrated with the liquid-crystal panel or a polarizing plate.

(9)

A liquid-crystal display apparatus, including:
a vertical-alignment-type liquid-crystal panel; and
an optical compensation unit including a negative C-plate and two O-plates, in which
an amount of a composite phase difference between the two O-plates and the negative C-plate in a tilt-direction cross section is substantially same as an amount of a phase difference produced by light having each of incident angles in a predetermined incident-angle range in the liquid-crystal panel, and a sign of the composite phase difference is opposite to a sign of the phase difference, the tilt-direction cross section being a cross section parallel to a tilt direction of liquid crystal in the liquid-crystal panel.

(10)

The liquid-crystal display apparatus according to (9), in which
the liquid-crystal panel is a transmission-type liquid-crystal panel.

(11)

The liquid-crystal display apparatus according to (9), in which the liquid-crystal panel is a reflective-type liquid-crystal panel.

(12)

The liquid-crystal display apparatus according to (9), in which an absolute value of an inclination coefficient of a composite phase difference between the two O-plates in the tilt-direction cross section in an approximate equation obtained by approximating a changing property of the composite phase difference with respect to an incident angle linearly is not 0, and is 0.65 or less.

(13)

The liquid-crystal display apparatus according to (12), in which the absolute value of the inclination coefficient is not 0, and is 0.6 or less.

(14)

The liquid-crystal display apparatus according to (12), in which a phase difference amount with respect to a 15-degree incident angle of the negative C-plate is 20 nm or less.

(15)

The liquid-crystal display apparatus according to any one of (9) to (14), in which when phase differences of the liquid-crystal panel with respect to the same incident angles on a positive side and on a negative side are compared with the composite phase difference in a cross section orthogonal to the tilt-direction cross section, a magnitude relationship between an absolute value of the phase difference with respect to the incident angle on the positive side and an absolute value of the phase difference with respect to the incident angle on the negative side is the same as a magnitude relationship between on a side of the liquid-crystal panel and on a side of the composite phase difference.

(16)

The liquid-crystal display apparatus according to any one of (9) to (15), in which the two O-plates and the negative C-plate are formed as an integrated optical compensation plate.

(17)

The liquid-crystal display apparatus according to any one of (9) to (15), in which a part or all of the two O-plates and the negative C-plate are separated and formed as separate compensation plates.

(18)

The liquid-crystal display apparatus according to any one of (9) to (15), in which a part or all of the two O-plates and the negative C-plate are formed and integrated with the liquid-crystal panel or a polarizing plate.

REFERENCE SIGNS LIST 1, 1A liquid-crystal display apparatus
Ls light source
5 polarization-conversion element
7 separation-composite optical system
8 dichroic mirror
9 dichroic mirror
10 filter
13 condenser lens
14 incident-side polarizing plate
15 (15R, 15G, 15B), 15' (15'R, 15'G, 15'B) liquid-crystal panel
15a board
15b liquid-crystal layer
16 emission-side polarizing plate
17 color-composite prism
18 projective lens (projective optical system)
19 reflective-type polarizing plate
20, 20A optical compensation unit
21, 21' optical compensation plate
22 board
23 negative C-plate
24a, 24b O-plate
25 board

The invention claimed is:

1. An optical compensation apparatus, comprising:
a negative C-plate; and
two O-plates,
wherein the negative C-plate and the two O-plates are formed as an integrated optical compensation plate,
a magnitude of a phase difference produced by light having a plurality of incident angles in a predetermined incident-angle range of the plurality of incident angles passing through a vertical-alignment-type liquid-crystal panel in a tilt direction cross section is approximated as a sum of equations represented by a quadratic curve and a linear straight line,
a magnitude of a first phase difference produced by the negative C-plate is substantially identical to a magnitude of a second phase difference represented by the quadratic curve,
a magnitude of a third phase difference produced by the two O-plates is substantially identical to a magnitude of a fourth phase difference represented by the linear straight line, and
a sign of the third phase difference produced by the two O-plates is opposite to a sign of the fourth phase difference represented by the linear straight line, and
the tilt-direction cross section is a cross section parallel to a tilt direction of liquid crystal in the vertical-alignment-type liquid-crystal panel.

2. The optical compensation apparatus according to claim 1, wherein an absolute value of an inclination coefficient of the third phase difference produced by the two O-plates in the tilt-direction cross section in an approximate equation obtained by approximating a changing property of the third phase difference with respect to an incident angle linearly is not 0, and is 0.65 or less, and an intercept, on the phase difference axis, in the approximate equation is negative.

3. The optical compensation apparatus according to claim 2, wherein the absolute value of the inclination coefficient is not 0, and is 0.6 or less.

4. The optical compensation apparatus according to claim 2, wherein the first phase difference amount with respect to a 15-degree incident angle of the negative C-plate is 20 nm or less.

5. The optical compensation apparatus according to claim 1, wherein a part or all of the two O-plates and the negative C-plate are formed and integrated with the liquid-crystal panel or a polarizing plate.

6. The optical compensation apparatus according to claim 1, wherein
when a first particular phase difference and a second particular phase difference of the liquid-crystal panel with respect to first and second identical incident angles on a first side and on a second side of the liquid-crystal panel, respectively, are compared with a composite phase difference in a cross section orthogonal to the tilt-direction cross section, a magnitude relationship between an absolute value of the first particular phase difference with respect to the first incident angle on the first side and an absolute value of the second particular phase difference with respect to the second incident angle on the second side is identical to a magnitude relationship between a phase difference on the second side of the liquid-crystal panel and a phase difference on a side of an optical compensation plate, including the two O-plates and the negative C-plate, corresponding to the composite phase difference.

7. A liquid-crystal display apparatus, comprising:
a vertical-alignment-type liquid-crystal panel; and
an optical compensation apparatus including a negative C-plate and two O-plates, wherein
the negative C-plate and the two O-plates are formed as an integrated optical compensation plate,
a magnitude of a phase difference produced by light having a plurality of incident angles in a predetermined incident-angle range of the plurality of incident angles passing through the vertical-alignment-type liquid-crystal panel in a tilt direction cross section is approximated as a sum of equations represented by a quadratic curve and a linear straight line,
a magnitude of a first phase difference produced by the negative C-plate is substantially identical to a magnitude of a second phase difference represented by the quadratic curve,
a magnitude of a third phase difference produced by the two O-plates is substantially identical to a magnitude of a fourth phase difference represented by the linear straight line, and
a sign of the third phase difference produced by the two O-plates is opposite to a sign of the fourth phase difference represented by the linear straight line, and
the tilt-direction cross section is a cross section parallel to a tilt direction of liquid crystal in the liquid-crystal panel.

8. The liquid-crystal display apparatus according to claim 7, wherein
the liquid-crystal panel is a transmission-type liquid-crystal panel.

9. The liquid-crystal display apparatus according to claim 7, wherein
the liquid-crystal panel is a reflective-type liquid-crystal panel.

10. The liquid-crystal display apparatus according to claim 7, wherein an absolute value of an inclination coefficient of the third phase difference produced by the two O-plates in the tilt-direction cross section in an approximate equation obtained by approximating a changing property of the third phase difference with respect to an incident angle linearly is not 0, and is 0.65 or less.

11. The liquid-crystal display apparatus according to claim 10, wherein the absolute value of the inclination coefficient is not 0, and is 0.6 or less.

12. The liquid-crystal display apparatus according to claim 10, wherein
the first phase difference amount with respect to a 15-degree incident angle of the negative C-plate is 20 nm or less.

13. The liquid-crystal display apparatus according to claim 7, wherein a part or all of the two O-plates and the negative C-plate are formed and integrated with the liquid-crystal panel or a polarizing plate.

14. The liquid-crystal display apparatus according to claim 7, wherein
when a first particular phase difference and a second particular phase difference of the liquid-crystal panel with respect to first and second identical incident angles on a first side and on a second side of the liquid-crystal panel, respectively, are compared with a composite phase difference in a cross section orthogonal to the tilt-direction cross section, a magnitude relationship between an absolute value of the first particular phase difference with respect to the first incident angle on the first side and an absolute value of the second particular phase difference with respect to the second incident angle on the second side is identical to a magnitude relationship between a phase difference on the second side of the liquid-crystal panel and a phase difference on a side of an optical compensation plate, including the two O-plates and the negative C-plate, corresponding to the composite phase difference.

15. An optical compensation method for a pre-tilted, vertical-alignment-type liquid-crystal panel, the method comprising:
determining a magnitude of a phase difference produced by light having a plurality of incident angles in a predetermined incident-angle range of the plurality of incident angles passing through the vertical-alignment type liquid crystal panel in a tilt direction cross section as a sum of equations represented by a quadratic curve and a linear straight line;
determining a structure of an optical compensation apparatus having a negative C-plate and two O-plates so that a magnitude of a first phase difference produced by the negative C-plate is substantially identical to a magnitude of a second phase difference represented by the quadratic curve, a magnitude of a third phase difference produced by the two O-plates is substantially identical to a magnitude of a fourth phase difference represented by the linear straight line, and a sign of the third phase difference is opposite to a sign of the fourth phase difference,
wherein the determining step comprises determining characteristics of the two O-plates such that the third phase difference in the tilt-direction cross section completely offsets the fourth phase difference, wherein the tilt-direction cross section is a cross section parallel to a tilt direction of liquid crystal in the vertical-alignment-type liquid-crystal panel.

16. The topical compensation method of claim 15, further comprising:
adjusting a configuration of the two O-plates or adjusting an angle between the liquid-crystal panel and each of the two O-plates so that
when a first particular phase differences difference and a second particular phase difference of the liquid-crystal panel with respect to first and second identical incident angles on a first side and on a second side of the liquid-crystal panel, respectively, are compared with a composite phase difference in a cross section orthogonal to the tilt-direction cross section, a magnitude relationship between an absolute value of the first particular phase difference with respect to the first incident angle on the first side and an absolute value of the second particular phase difference with respect to the second incident angle on the second side is identical to a magnitude relationship between a phase difference on the second side of the liquid-crystal panel and a phase difference on a side of an optical compensation plate, including the two O-plates and the negative C-plate, corresponding to the composite phase difference.

* * * * *